US010947927B2

(12) United States Patent
Todorovic et al.

(10) Patent No.: US 10,947,927 B2
(45) Date of Patent: Mar. 16, 2021

(54) MIXER FOR AN ENGINE MANUFACTURED FROM AT LEAST ONE COMPOSITE MATERIAL, MANUFACTURING METHOD AND MANUFACTURING DEVICE

(71) Applicant: Rolls-Royce Deutschland Ltd & Co KG, Blankenfelde-Mahlow (DE)

(72) Inventors: Predrag Todorovic, Berlin (DE); Thomas Kubisch, Koenigs-Wusterhausen (DE); Bernhard Maron, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 552 days.

(21) Appl. No.: 15/803,269

(22) Filed: Nov. 3, 2017

(65) Prior Publication Data

US 2018/0135556 A1 May 17, 2018

(30) Foreign Application Priority Data

Nov. 16, 2016 (DE) ...................... 10 2016 222 583.9

(51) Int. Cl.
*B29C 70/30* (2006.01)
*F02K 1/38* (2006.01)
(Continued)

(52) U.S. Cl.
CPC ............ *F02K 1/386* (2013.01); *F01D 25/005* (2013.01); *F01D 25/30* (2013.01); *F02K 1/48* (2013.01);
(Continued)

(58) Field of Classification Search
CPC ....... B29C 33/485; B29C 33/50; B29C 33/76; B29C 70/462
See application file for complete search history.

(56) References Cited

U.S. PATENT DOCUMENTS 5,884,472 A * 3/1999 Presz, Jr. .................. F02K 1/36
239/265.17
8,375,699 B1 2/2013 Atassi et al.
(Continued)

FOREIGN PATENT DOCUMENTS

EP          3032083 A1      6/2016
EP          3109450 A1     12/2016
WO     WO2014007907 A2     1/2014

OTHER PUBLICATIONS

German Search Report dated Jul. 5, 2017 for counterpart German Application No. 10 2016 222 583.9.
(Continued)

*Primary Examiner* — Matthew J Daniels
(74) *Attorney, Agent, or Firm* — Shuttleworth & Ingersoll, PLC; Timothy Klima

(57) ABSTRACT

It is provided a mixer for an engine, that for the mixing of fluid flows from a primary flow channel and a secondary flow channel of the engine, respectively has multiple first and second guide elements that alternate along a circumferential direction and extend along a central axis, wherein the first guide elements are formed in a diffusor-like manner with at least one radially outwardly extending section, and the second guide elements are formed in a nozzle-like manner with at least one radially inwardly extending section, and the mixer is made of a composite material with at least two separate material layers. The at least two material layers are arranged with their edges along the central axis in an overlapping manner and/or edge to edge, and namely in an area of the mixer in which the first and second guide elements are provided.

7 Claims, 23 Drawing Sheets

(51) Int. Cl.
*F01D 25/30* (2006.01)
*F01D 25/00* (2006.01)
*F02K 1/48* (2006.01)

(52) U.S. Cl.
CPC ............... *F05D 2300/6033* (2013.01); *F05D 2300/6034* (2013.01); *Y02T 50/60* (2013.01)

(56) References Cited

U.S. PATENT DOCUMENTS

| | | | |
|---|---|---|---|
| 8,584,356 B2 | 11/2013 | Philippe et al. | |
| 2004/0068981 A1* | 4/2004 | Siefker | F02K 1/48 60/262 |
| 2008/0115484 A1* | 5/2008 | Conete | F02K 1/48 60/262 |
| 2010/0005780 A1 | 1/2010 | Philippe et al. | |
| 2010/0126183 A1* | 5/2010 | Conete | F02K 1/386 60/796 |
| 2015/0107225 A1* | 4/2015 | Dindar | F02K 1/48 60/262 |

OTHER PUBLICATIONS

European Search Report dated Apr. 9, 2018 from counterpart EP App No. 17199897.4.

* cited by examiner

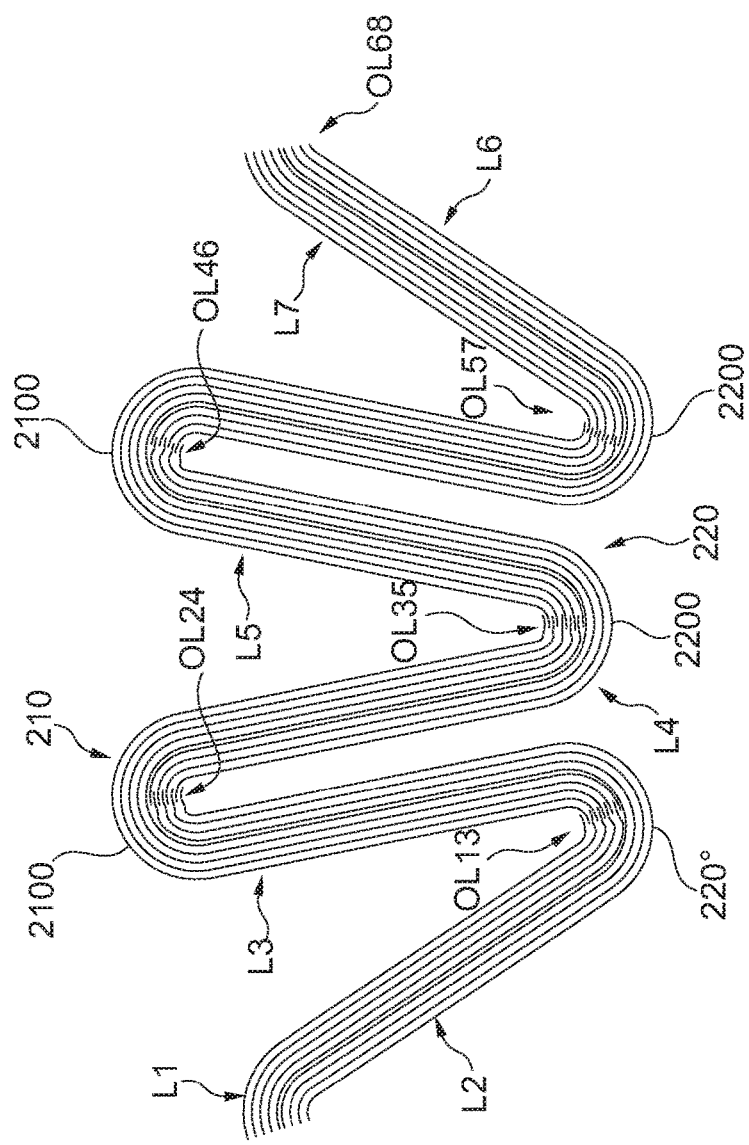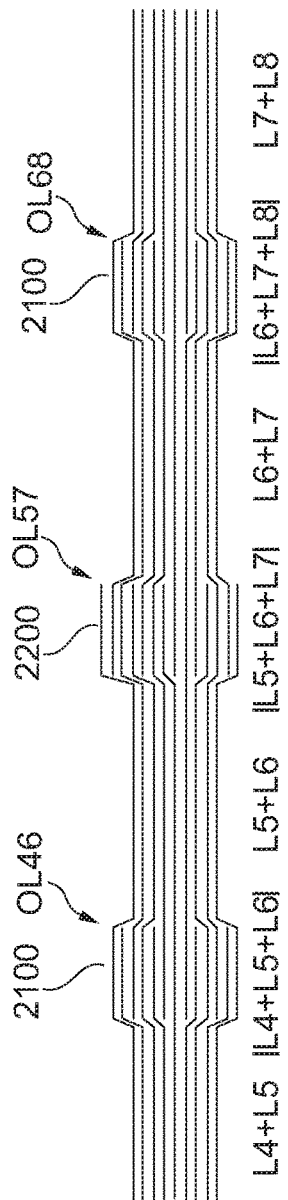
Fig. 5
Fig. 5A

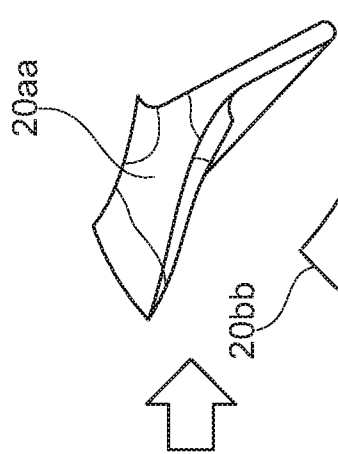
Fig. 16A
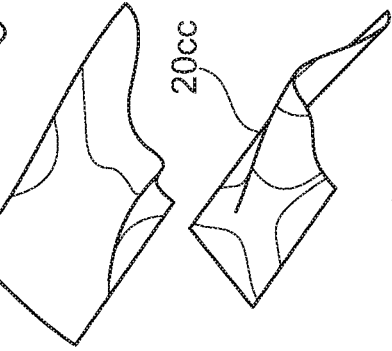
Fig. 16B
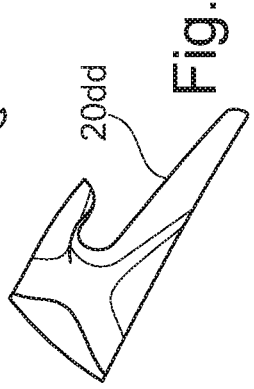
Fig. 16C
Fig. 16D
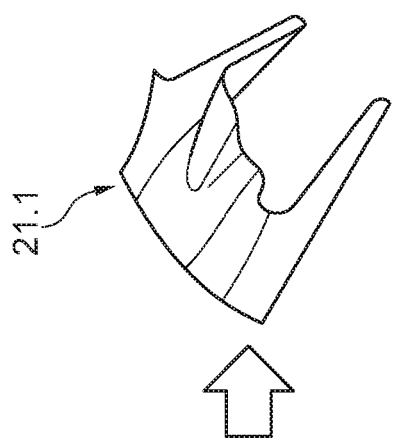
Fig. 15
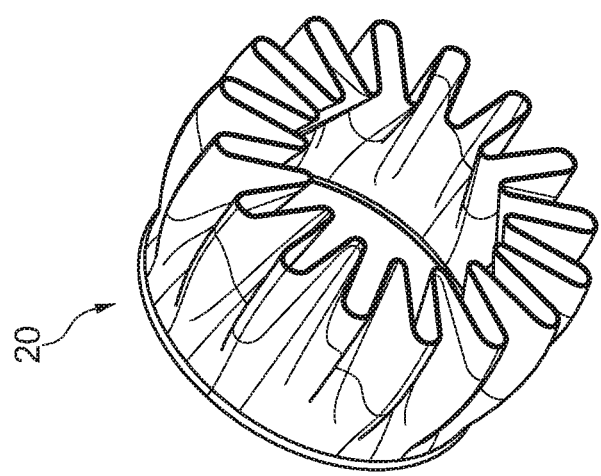
Fig. 14

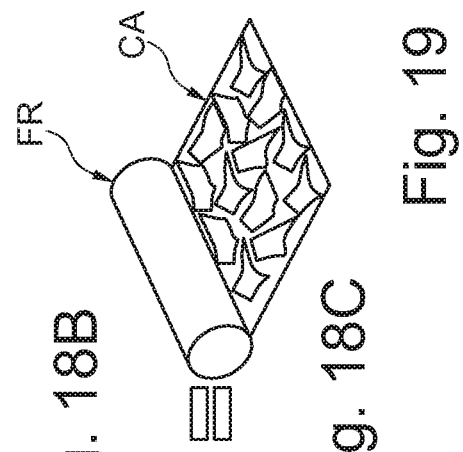
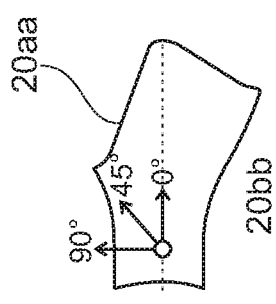 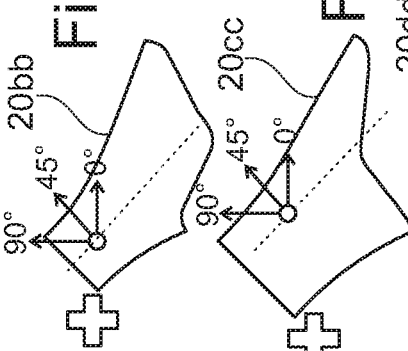 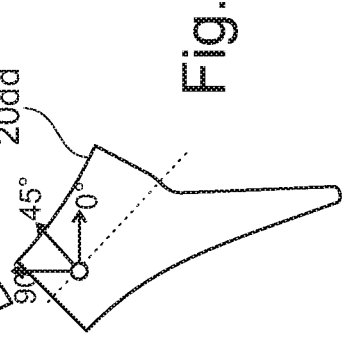
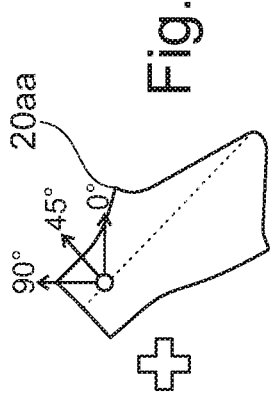 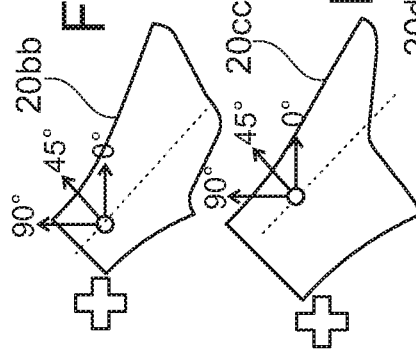 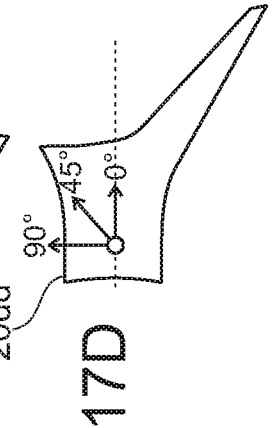

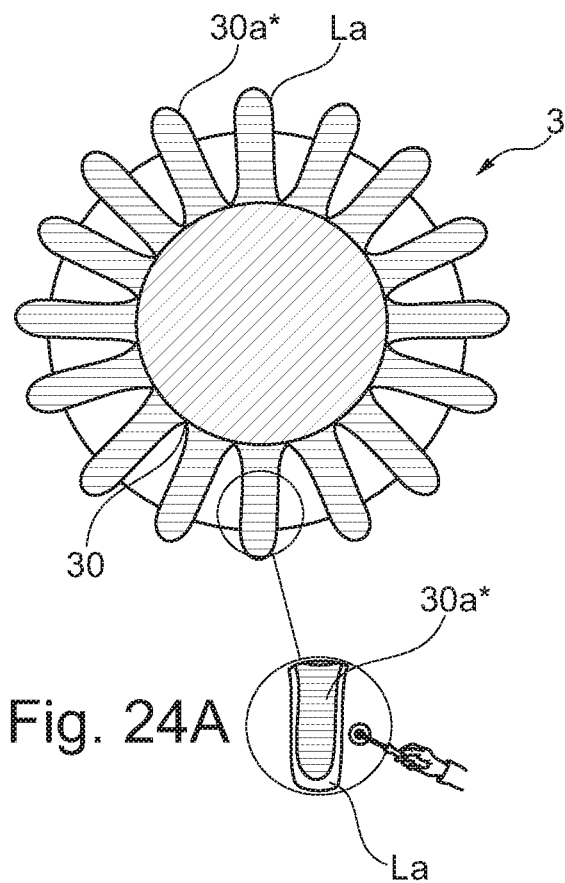
Fig. 24
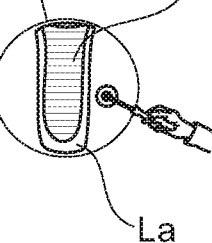
Fig. 24A
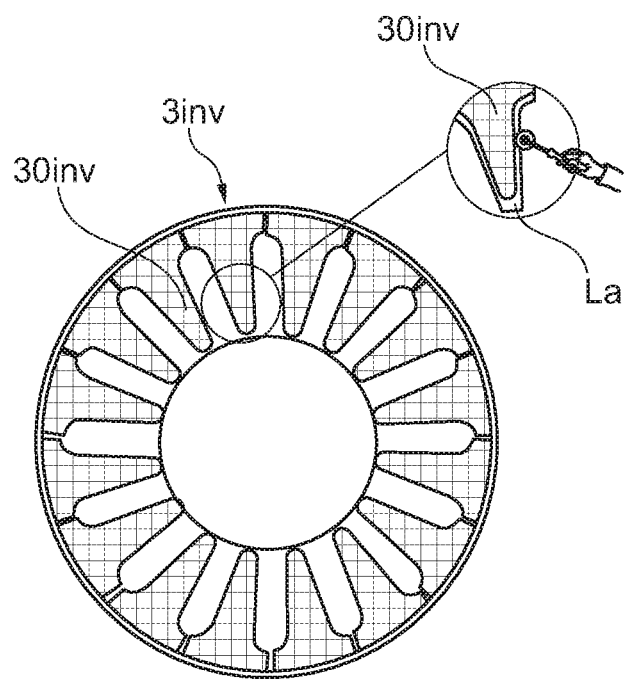
Fig. 25A
Fig. 25

MIXER FOR AN ENGINE MANUFACTURED FROM AT LEAST ONE COMPOSITE MATERIAL, MANUFACTURING METHOD AND MANUFACTURING DEVICE

REFERENCE TO RELATED APPLICATION

This application claims priority to German Patent Application No. 10 2016 222 583.9 filed on Nov. 16, 2016, the entirety of which is incorporated by reference herein.

BACKGROUND

The invention relates to a mixer for an engine as well as to a method for manufacturing a mixer and a device for manufacturing a mixer.

The use of a mixer in the area of the exhaust of an engine is widely known. In turbofan engines, the mixer is configured and provided for intermixing fluid flows from a primary flow channel and a secondary flow channel of the engine before they are discharged into the environment. A first, warm or hot, primary fluid flow is intermixed with a second cooler secondary fluid flow via a corresponding (exhaust) mixer as part of a mixer system in order to increase the achievable thrust and to reduce engine noise.

What is for example known from EP 3 032 083 A1 in this context is a mixer for a turbofan engine having a blossom-shaped or meander-shaped contour (also referred to in technical jargon as a "lobed mixer"). At that, the mixer is preferably made of ceramic matrix composite (CMC) and facilitates an efficient intermixing of a primary fluid flow from a primary flow channel of the core engine of the turbofan engine, which is warm or hot during operation, with a cooler secondary fluid flow from the secondary or bypass channel before both fluid flows flow outwards over an outlet cone at an outlet nozzle of the turbofan engine. Mixers with comparable geometries are further known from US 2010/0005780 A1 and WO 2014/007907 A2.

What is proposed in US 2010/0005780 A1 for the manufacturing of the mixer from a composite material by means of at least two fiber-containing material layers is to manufacture the mixer in segments from material layers in the form of batts which overlap at their edges and are fixated to each other at their edges, e.g. by being sawed together. Here, the connection of the individual material layers is in particular provided in the area of first and second guide elements of the mixer, which are formed, in the case of the first guide elements, in a diffusor-like manner with at least one radially outwardly extending section and, in the case of the second guide elements, in a nozzle-like manner with at least one radially inwardly extending section. The connection of the individual material layers is thus in particular provided in the area of the alternating lobes and gullies of a mixer having a blossom-shaped or meander-shaped contour. Here, the edges of the individual material layers are to be reduced in a targeted manner so as not to influence the structure of the mixer in the connection area of the overlapping edges of multiple (at least two) material layers, and to form it preferably with a continuously uniform wall thickness.

According to the teaching of US 2010/0005780 A1, the individual material layers are arranged at a manufacturing tool that represents a positive mold for a mixer to be manufactured. At that manufacturing tool, the corresponding batts are connected to each other and pre-formed according to the intended use, before subsequently a curing process is carried out, in dry batts for example by infiltration of a matrix material, or in pre-impregnated batts by means of pyrolysis.

However, the manufacturing methods that are known so far for constructing a mixer for an engine from a composite material have in common that the connection of the individual material layers at their edges is not made use of in a targeted manner for adjusting the characteristics of the mixer. Also, so far barely any manufacturing methods and manufacturing devices are known that allow for an efficient manufacturing of mixers with a complex geometry, and in particular with a blossom-shaped or meander-shaped contour.

SUMMARY

Therefore, it is an objective of the invention to provide a solution that is improved in this regard.

This objective is achieved through a mixer with features as described herein as well as through the manufacturing method with features as described herein and a manufacturing device with features as described herein.

A mixer according to the invention for an engine is provided and configured for mixing fluid flows from a primary flow channel and a secondary flow channel of the engine, and for this purpose has respectively multiple first and second guide elements that alternate along a circumferential direction of the mixer and extend along a central axis of the mixer. Here, the first guide elements are formed in a diffusor-like manner with at least one radially outwardly extending section, and the second guide elements are formed in a nozzle-like manner with at least one radially inwardly extending section. The mixer is made of a composite material with at least two separate material layers, wherein each material layer has an edge that extends—for example in a straight or curved manner—along the central axis. The individual material layers are for example part of a ceramic matrix composite (CMC). The at least two material layers are arranged with their edges along the central axis, in an overlapping manner for the purpose of stiffening the structure of the mixer at least locally, and/or edge to edge for reducing the stiffness at least locally, and namely in an area of the mixer in which the first and second guide elements are provided.

The arrangement of the edges of two material layers relative to each other is thus used in a targeted manner for locally influencing the stiffness of the structure of the mixer. At that, material layers overlapping each other are provided in a targeted manner for at least local stiffening, in particular by creating a local thickening due to the material layers that are overlapping each other at the edge side. In contrast to that, material layers that are arranged edge to edge and respectively preferably contain ceramic fibers are provided for at least a local stiffness reduction and, associated herewith, for the targeted insertion of an area with a higher flexibility for an elastic deformation of the mixer in this area during operation of the engine.

Here, the provision of material layers that are overlapping and/or are arranged edge to edge at the edge side in particular includes two material layers being arranged in an overlapping manner in a (first) area, and the same two material layers or two other material layers being arranged edge to edge in another (second) area (i.e., are butted together with their edges in the manner of a butt joint).

The first guide elements (pointing radially outwards) can be arched in a convex manner. Alternatively or additionally, the second guide elements (pointing radially inwards) can be arched in a concave manner. Here, the at least two material layers are arranged in the area of the convex and/or concave arch along the central axis either overlapping each other or edge to edge. Thus, the first and second guide elements that alternate along the circumference of the mixer can define a blossom-shaped or meander-shaped contour of the mixer, in which the first and second guide elements are formed in the manner of alternating lobes and gullies. Thanks to the material layers that are made to overlap and/or to be positioned edge to edge at the edge side in a targeted manner and that preferably comprise ceramic fibers, a targeted local adjustment of the stiffness of the mixer structure is then already achieved through the arrangement of the edges of individual planar material layers, in particular in a mixer with such a complex three-dimensional contour. For example, through the material layers that are positioned edge to edge a lesser local stiffness is provided in order to allow for a stronger (elastic) deformation during operation of the engine. Local stiffening through overlapping material layers can be provided alternatively or additionally to that.

For example, two adjacent first and second guide elements, i.e. first and second guide elements that are directly succeeding each other in circumferential direction, have a common side wall that extends between a radially outermost section of the first guide element and a radially innermost section of the second guide element. The side wall is thus part of the first as well as of the second guide element. In one embodiment variant, the at least two material layers are arranged at this side wall in an overlapping manner along the central axis.

In one embodiment variant, the side wall that is common to two adjacent first and second guide elements extends along the central axis with a radial extension that increases in one direction. In other words, the side wall is enlarged in a longitudinal direction of the mixer that points in the direction of an exhaust of the engine and thus in the flow direction of the fluid flows in the mounted state of the mixer. Here, the radially increasing extension of the side wall results from the first and second guide elements that point radially inwards and outwards.

In one embodiment, edge rims of the overlapping material layers that extend along the central axis respectively have a course that comprises—with respect to the central axis—a directional component in the circumferential direction as well as a directional component in the radial direction in addition to an axial directional component. The edge rims of the at least two overlapping material layers thus extend in the three-dimensional space, so that, with respect to a longitudinal extension direction of the mixer along the central axis, a front starting point of the edge rim is offset with respect to at least one further point of the edge rim in three spatial directions. The further point of the edge rim that is located downstream in the mounted state of the mixer is thus offset in three spatial directions with respect to the starting point of the edge rim that is located upstream. Thus, in this variant, the overlapping edge rims do not run in a linear manner in the axial direction, but are realized for example as a spline and extend at the mixer in a curved manner with respect to at least two spatial axes that are perpendicular to one another. A thickening or stiffening of the mixer structure that is defined by the overlapping edges of the at least two material layers thus follows a comparatively complex course and can thus be particularly laid along an area of the first and second guide elements, that is submitted to stronger mechanical loads during operation of the engine and/or at which possible thickening of the outer and/or the inner contour of the mixer leads at most leads to minor influences on the first and second fluid flows at the mixer.

In one embodiment, in addition to the at least two material layers that are arranged in an overlapping manner or edge to edge, at least a further material layer is provided, extending in the circumferential direction beyond that area in which the edges of the at least two material layers are placed on top of each other (in material layers that are arranged in an overlapping manner) or adjacent to each other (in material layers that are arranged edge to edge). The at least one further material layer thus extends in the circumferential direction beyond the area of overlapping or adjoining edges of two other material layers, and partially or completely covers that area along the central axis. Thus, the mixer has at least three layers for example in that area in which two material layers are arranged in an overlapping manner, and has at least two layers in the area in which two material layers are arranged edge to edge.

In one embodiment, at least one material layer is formed by a batt that extends along the circumferential direction over at least one radially outermost section of the first guide element and/or over at least one radially innermost section of the second guide element. Consequently, a segment of the mixer that comprises a first guide element and/or a second guide element partially or completely in the circumferential direction, is (co-)formed at the mixer by at least one batt. Such a batt may for example contain ceramic filaments.

In a further development, the batt extends along the circumferential direction over exactly one radially outermost section of the first guide element, or over exactly one radially innermost section of the second guide element. In a mixer with a blossom-shaped or meander-shaped contour, such a batt thus defines exactly one single lobe or one single gully including a side wall for the gully directly adjoining thereto or the lobe of the mixer directly adjoining thereto, for example.

In principle, the batt can extend across the entire length of the mixer in that area of the mixer in which the batt is provided, namely in a longitudinal direction that extends in parallel to the central axis. In other words, no batt is provided in the axial direction in front or behind the batt for forming the mixer structure. The batt thus (co-)defines a segment of the mixer over the entire axial length.

In principle, one material layer of the mixer can be a part of a ceramic composite material, wherein the fibers and the matrix of the composite material can comprise a ceramic material, in particular carbon. The material layer can correspondingly comprise SiC fibers as well as ceramic filament materials. The fibers or filaments can be of the same type as well as of mixed types. For example, glass and carbon fibers may be combined. A resin matrix of a part of the mixer that is formed by means of the at least two material layers can be converted by pyrolysis, and can be densified by introducing further resin material (polymer filtration) and renewed pyrolysis. In particular for this purpose, inorganic fiber materials including ceramic filaments of (e.g. pyrolytic) carbon, graphite, glass, and aramid can be used. Further, (pyrolytic) carbon, silicon carbide, aluminum oxide, silicon nitride, mullite, boron, tungsten, boron carbide, boron nitride and zirconium can be used as ceramic filaments, for example.

A further aspect of the subject matter of the invention is a method for manufacturing a mixer from a composite material by means of at least two material layers that respectively preferably contain ceramic fiber. At that, the material layers are usually embodied in a flexible manner, so that they can be arranged and preformed at a manufacturing tool that serves as a positive or negative mold for the mixer to be manufactured.

As part of the method according to the invention, it is provided that the at least two material layers for forming the first and second guide elements that alternate along a circumferential direction and have a radially outward pointing section or a radially inward pointing section, are arranged with their edges along the central axis in an overlapping manner for at least a local stiffening of the structure of the mixer and/or edge to edge for at least a local reduction in stiffness.

Thus, a mixer according to the invention can be manufactured by means of a manufacturing method according to the invention. Correspondingly, the advantages and features of embodiment variants of a mixer according to the invention that are explained above as well as in the following also apply to embodiment variants of a manufacturing method according to the invention, and vice versa.

In one embodiment variant, at least two respectively flexible material layers are arranged at a manufacturing tool that determines a contour of the mixer. Here, the material layers are submitted to a curing process at this manufacturing tool. What is understood by a curing process here is in particular a hardening procedure that possibly comprises multiple steps, or a corresponding hardening process which may for example comprise a heat treatment and/or the infiltration of a matrix material of the composite material. A part of the curing process can for example be an infusion method (such as for example VAR®—Vacuum Assisted Process, or VARI—Vacuum Assisted Resin Injection), an autoclaving process, or an injection method, in particular resin transfer molding (RTM).

The manufacturing tool can comprise a positive mold. Here, the manufacturing tool extends along a longitudinal axis that coincides with the central axis of the mixer and has radial arms that are projecting radially outwards for defining the first (and second) guide elements of the mixer. At that, the at least two material layers are arranged at an outer contour of the manufacturing tool.

Alternatively or additionally, a negative mold may be provided. In that case, a corresponding manufacturing tool also extends along a longitudinal axis that coincides with the central axis of the mixer. However, here the manufacturing tool surrounds, in the shape of a circular ring, a hollow space into which radially inwardly extending radial arms of the manufacturing tool extend for defining the second (and first) guide elements of the mixer. At that, the at least two material layers are arranged at an inner contour of such a manufacturing tool. Of course, also two manufacturing tools can be combined with each other as a positive mold and a corresponding negative mold so as to realize an injection method, wherein the material layers are arranged in an intermediate space defined by both tools, before the corresponding matrix is inserted between the fiber, e.g. by infiltration, for the purpose of curing.

For an easier demolding of the mixer from the manufacturing tool, the manufacturing tool can have draft angles at the radial arms and/or at a base body of the manufacturing tool at which the radial arms are provided. Due to the draft angles in the area of the radial arms, side walls of a guide element located opposite each other in the circumferential direction may extend at an angle, and therefore not parallel to each other.

However, a parallel course of side walls that are located opposite each other and respectively extend axially may be preferable with a view to aerodynamics. What is proposed against this background in one variant is a manufacturing tool for manufacturing a mixer with side walls of the first and second guide element that extend in parallel to each other in the axial direction. At that, the manufacturing tool can have at least one radial arm that is supported at the base body by means of a form fit and that is displaceable along the longitudinal axis relative to the base body, and/or the manufacturing tool has a channel system for at least locally heating and/or cooling the manufacturing tool by means of a fluid in a targeted manner, so that a temperature-caused expansion or shrinkage of the manufacturing tool can be controlled to facilitate demolding. For example, at least the radial expansion of the radial arms during curing of the mixer or during a demolding process can be controlled through the fluid that is guided inside the channel system, so that it cools off (stronger) and thus shrunk for demolding, and the mixer can be removed from the radial arms. In one variant, multiply branched fluid channels in the interior of the manufacturing tool are part of the channel system. Particularly effective is the use of a channel system in a manufacturing tool that has radial arms made of a material with a comparatively high thermal expansion coefficient.

Apart from easier demolding, the controlled tempering of the manufacturing tool by means of the channel system can also be used for the targeted control of the curing process or, in infiltration methods, the control of the resin flow front. Thus, on the one hand, the channel system can be configured and provided for heating and/or cooling the manufacturing tool to facilitate a temperature-caused expansion or shrinkage of the manufacturing tool for the purpose of demolding. On the other hand, the channel system can be configured and provided for heating the manufacturing tool for a targeted control of a curing processes of the mixer structure that is to be formed by means of the manufacturing tool, in particular in the infiltration method for controlling a resin flow front.

The at least two material layers used for manufacturing the mixer can be formed by pre-impregnated batts (in other words by so-called "prepregs", i.e. pre-impregnated textile fiber matrix pre-products). Alternatively, the at least two material layers can be formed by batts that are impregnated after having been arranged at a manufacturing tool that predefines the contour of the mixer. In both cases, the arrangement of the batts according to the invention is performed in such a manner that their edges overlap or are placed edge to edge in defined areas for influencing the stiffness prior to the curing being carried out, and thus the mixer is manufactured in one piece from a composite material.

In one embodiment variant, it is provided for the purpose of cost-reduction in the manufacture of the mixer that the at least two material layers are cut out from the material surface, wherein 1. the at least two material layers are provided for forming at least or only exactly one segment of the mixer,
2. the geometries of the at least two material layers are determined in an automated manner, i.e. in a computer-aided manner by using at least one algorithm, with at least one design parameter being prescribed, and
3. the at least two material layers with the geometries that are determined in an automated manner are cut out from the material surface in such a way that a minimum amount of offcuts is created, wherein a specification of an arrangement of the sectional lines for the at least two material layers at the material surface, as it is necessary for this purpose, is likewise carried out in an automated manner.

The material surface is for example obtained by means of rolling out a rolled up batt. The at least one design parameter, based on which the geometries of the at least two material layers are determined in an automated manner, can for example be the specification of predefined overlapping areas in which the edges of the material layers are supposed to overlap, and/or the specification of predefined joint areas in which the edges of the material layers are to be arranged edge to edge at the mixer. As for the software, it can thus be specified that stiffening due to overlapping material layer edges and/or reductions in stiffness due to butted together material layer edges are to be provided in certain defined positions and areas for a desired mixer contour, and that for this purpose a segment of the mixer is to be manufactured from material layers formed by batts that have matching geometries for this purpose. These geometries are determined in a computer-aided manner and are subsequently virtually arranged, also in a computer-aided manner, on a given and for example rectangular material surface, namely in such a way that a minimum amount of offcuts is created when the corresponding material layers are cut out from the material surface.

A further aspect of the invention relates to a device for manufacturing a mixer for an engine, in particular for performing a manufacturing method according to the invention. The mixer that is to be manufactured here by means of the device preferably has a blossom-shaped or meander-shaped contour, with first and second guide elements that take the form of lobes and gullies for intermixing first and second fluid flows in the area of the exhaust of an engine.

Here, the device comprises at least one manufacturing tool for the mixer, wherein multiple first and second guide elements of the mixer that alternate along a circumferential direction and extend along a central axis are pre-determined in such a manner through an (outer and/or inner) contour of the manufacturing tool that the first guide elements are formed at the manufacturing tool in a diffusor-like manner with at least one radially outwardly extending section, and the second guide elements are formed at the manufacturing tool in a nozzle-like manner with at least one radially inwardly extending section.

For the specification of the first and second guide elements, the manufacturing tool has a base body that extends analogously to the longitudinal axis which coincides with the central axis of the mixer, with multiple radially projecting radial arms that are arranged at a distance to each other in the circumferential direction about the longitudinal axis being provided at the base body for defining the contours of the first and second guide elements. The manufacturing tool that is embodied as a negative mold or as a positive mold for the mixer, at which for example dry or pre-impregnated batts for a mixer to be manufactured from a ceramic fiber-reinforced composite are arranged, has at least one radial arm for facilitating demolding of the mixer from the manufacturing tool, with the arm being supported at the base body by means of a form fit and being displaceable along the longitudinal axis relative to the base body.

For a form-fit connection, the base body can for example have a longitudinal groove, and the radial arm can have a fastening web that is dovetail-shaped or has a T-shaped cross-section.

By virtue of at least one of the radial arms or all radial arms of the manufacturing tool being supported so as to be axially displaceable at the base body in a targeted manner, i.e. primarily in the axial direction, the demolding of the mixer following curing can be considerably facilitated. This is particularly advantageous in a large CMC mixer that is supposed to be manufactured in one piece from a ceramic matrix composite and to have a blossom-shaped or meander-shaped contour for mixing the first and second fluid flows from the primary and secondary flow channel of an engine.

In a further development based hereon, it is provided that the base body tapers off in a longitudinal direction along the longitudinal axis, while the radial arms provided at the base body respectively taper off counter to this longitudinal direction. In other words, in this variant a radial expansion of the base body in the longitudinal direction decreases, while a radial expansion of each radial arm at the base body increases in the longitudinal direction, so that the diffusor-like embodiment of the first guide elements and at the same time the nozzle-like embodiment of the second guide elements are formed at the mixer by means of the manufacturing tool. In particular as a result of this, the demolding is rendered correspondingly difficult if curing of fiber-containing material layers for the walls of the mixer is to be performed at the manufacturing tool. The corresponding geometry and contour of such a mixer obstructs a simple separation of the mixer from the shaping manufacturing tool. This problem can be effectively tackled by means of a radial arm that is supported at the base body so as to be displaceable in a targeted manner, or by multiple radial arms that are supported in a displaceable manner. In this way, the mixer can still be manufactured in one piece from a composite material in a cost-effective manner. In an exemplary embodiment, each radial arm can for example be expanded along the longitudinal axis from a longitudinal fastening groove of the base body in the longitudinal direction.

In one variant, the manufacturing tool for manufacturing a mixer with side walls of the first and second guide elements, extending in parallel to each other in the axial direction, is provided. Here, the manufacturing tool can have a channel system for heating and/or cooling the manufacturing tool in a targeted manner at least locally by means of a fluid (e.g. water, oil, etc.), so that a temperature-caused expansion or shrinkage of the manufacturing tool can be controlled so as to facilitate demolding. For example, at least the radial expansion of the radial arms can be controlled during curing the mixer or during a demolding process by means of the liquid that is conducted inside the channel system, so that it can be cooled off (stronger) for demolding and thus shrunk, and the mixer can be removed from the radial arms. In one variant, multiple branched fluid channels in the interior of the manufacturing tool are a part of the channel system. The use of a channel system is particularly effective in a manufacturing tool with radial arms made of a material with a comparatively high thermal expansion coefficient.

The demolding of the mixer from the manufacturing tool can be facilitated alternatively or additionally by manufacturing the base body and/or at least one of the radial arms of the manufacturing tool from a material that has a higher thermal expansion coefficient than stainless steel, e.g. aluminum. The use of a material with a comparatively high thermal expansion coefficient (for example higher than $17 \times 10^{-6} K$) causes the base body and/or the respective radial arm to expand comparatively strongly during curing, in particular to expand radially. After the manufacturing tool has cooled off, the respective structural component is considerably shrunk again, and thus removing the mixer from the manufacturing tool is facilitated, in particular [when it comes to] side walls that extend in parallel.

Further, an engine is part of the solution according to the invention, in particular a turbofan engine with a mixer according to the invention. This in particular includes that the engine has a mixer that is manufactured by means of a method according to the invention and/or by using a device according to the invention.

BRIEF DESCRIPTION OF THE DRAWINGS

The accompanying Figures illustrate possible embodiment variants of the solution according to the invention by way of example.

FIG. 5 shows, in a view corresponding to FIG. 2, a sectional view with an alternative structure of the material layers.

FIG. 5A shows a schematic sectional view of the material layers of FIG. 5 in an unfolded state and in an alternative layering.

FIGS. 10A-10B show differently constructed mixer segments for the section of FIG. 10.

FIGS. 14 to 19 show an illustration of a variant of a method according to the invention for manufacturing a mixer corresponding to FIG. 1, in which multiple material layers for a single segment of the mixer are cut out in a computer-aided and automated manner from a material surface of a fiber roll for the subsequent arrangement at a manufacturing tool.

FIGS. 24 to 24A show a schematic illustration of a variant of a manufacturing method according to the invention using a positive mold corresponding to FIGS. 13A to 13E.

FIGS. 25 to 25A show a SCHEMATIC illustration of a variant of a manufacturing method according to the invention using a manufacturing tool as a negative mold for the mixer.

DETAILED DESCRIPTION

Figure 27:
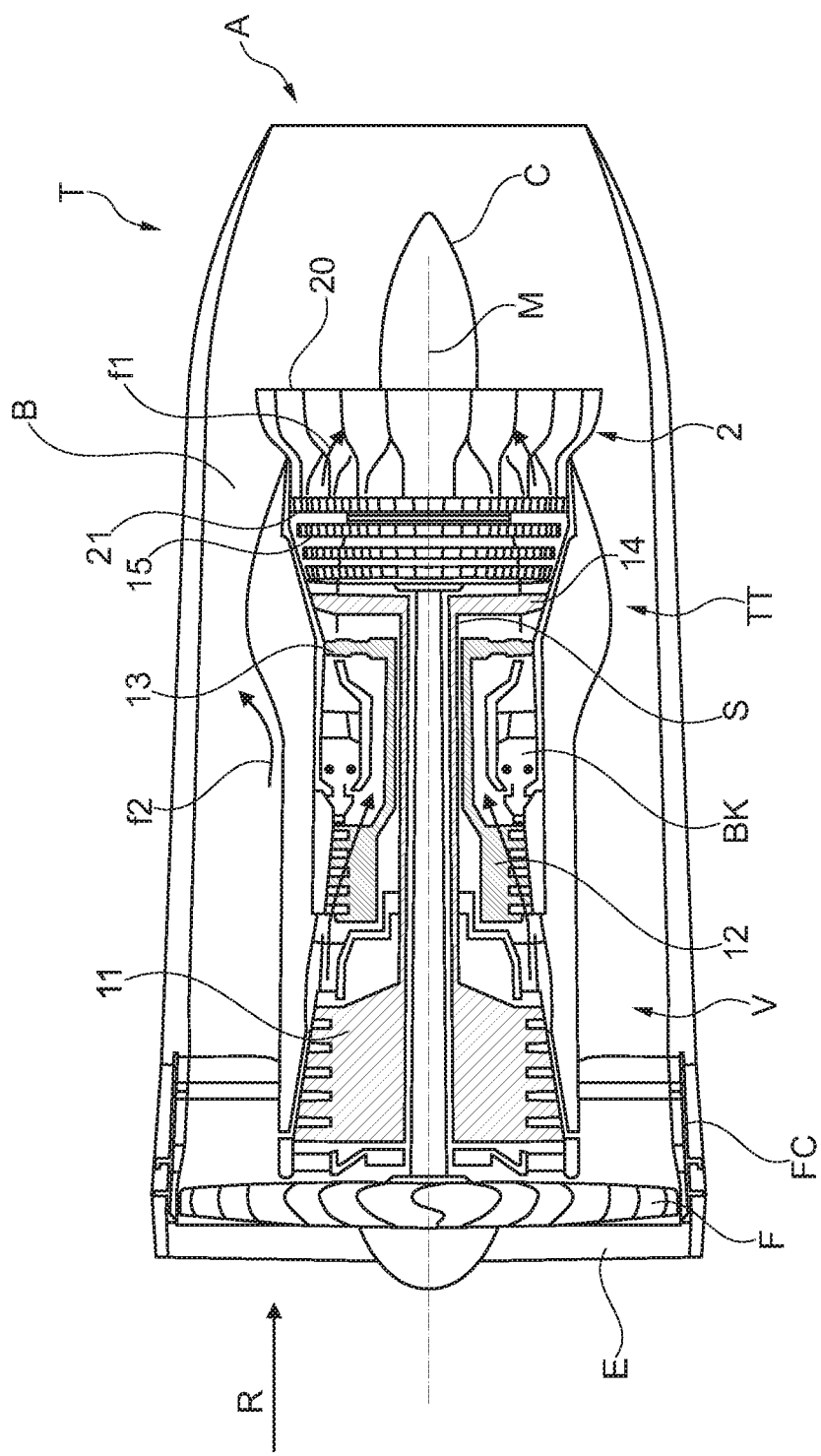
FIG. 27 shows a cross-sectional view of a turbofan engine according to the invention with a mixer in the area of an exhaust of the turbofan engine.

FIG. 27 illustrates, in a schematic manner and in sectional view, a (turbofan) engine T in which the individual engine components are arranged in succession along a rotational axis or central axis M. At an inlet or intake E of the engine T, air is sucked in along an entry direction R by means of a fan F. This fan F, which is arranged in a fan housing FC, is driven via a rotor shaft RS that is set into rotation by a turbine TT of the engine T. Here, the turbine TT connects to a compressor V, which for example has a low-pressure compressor 11, and a high-pressure compressor 12, as well as possibly also a medium-pressure compressor. The fan F supplies air to the compressor V, on the one hand, as well as, on the other hand, to the secondary flow channel or bypass channel B in order to create the thrust. Here, the bypass channel B extends about a core engine that comprises the compressor V and the turbine TT as well as a primary flow channel for the air that is supplied to the core engine by the fan F.

The air that is conveyed via the compressor V into the primary flow channel reaches a combustion chamber section BK of the core engine, where the driving power for driving the turbine TT is generated. For this purpose, the turbine TT has a high-pressure turbine 13, a medium-pressure turbine 14, and a low-pressure turbine 15. Here, the turbine TT drives the rotor shaft RS and thus the fan F by means of the energy released during combustion in order to create the required thrust by means of the air that is conveyed into the bypass channel B. The air from the bypass channel B as well as the exhausts from the primary flow channel of the core engine flow out via an exhaust A at the end of the engine T. Here, the exhaust A usually has a thrust nozzle with a centrally arranged outlet cone C.

In particular for the purpose of noise reduction, a mixer 20 is provided in the area of the exhaust A as part of a mixer assembly group 2. A first fluid flow f1 from the primary flow channel that is discharged form the core engine behind the low-pressure turbine 15 and a second fluid flow f2 from the bypass channel B are intermixed by this mixer assembly group 2 and its mixer 20. For this purpose, parts of the first (primary) fluid flow f1 from the core engine are alternatingly guided outwards and the second (secondary) fluid flow f2 from the bypass channel B is guided inwards via a blossom-shaped or meander-shaped contour of the mixer 20. In this manner, segments of hot and cold flow zones are created, and an intermixing of the two fluid flows f1 and f2 is achieved. Due to turbulences occurring during intermixing, low-frequency noise is reduced and high-frequency noise is amplified, so that the audible nose range is reduced as a result.

In the present case, the mixer 20 is preferably manufactured from a fiber reinforced composite, in particular a ceramic matrix composite, and thus for example as a CMC mixer. In the embodiment variants that will be explained in more detail in the following, the mixer has guide elements 210, 220 that define the meander-shaped contour of the mixer 20 and are formed in the manner of alternating lobes and gullies about a mixer opening O. Via these guide elements 210, 220, the first and second fluid flows f1 and f2 from the primary flow channel of the core engine and the bypass channel B are alternatingly guided outwards and inwards to obtain the desired intermixing of the fluid flows f1 and f2.

Figure 1:
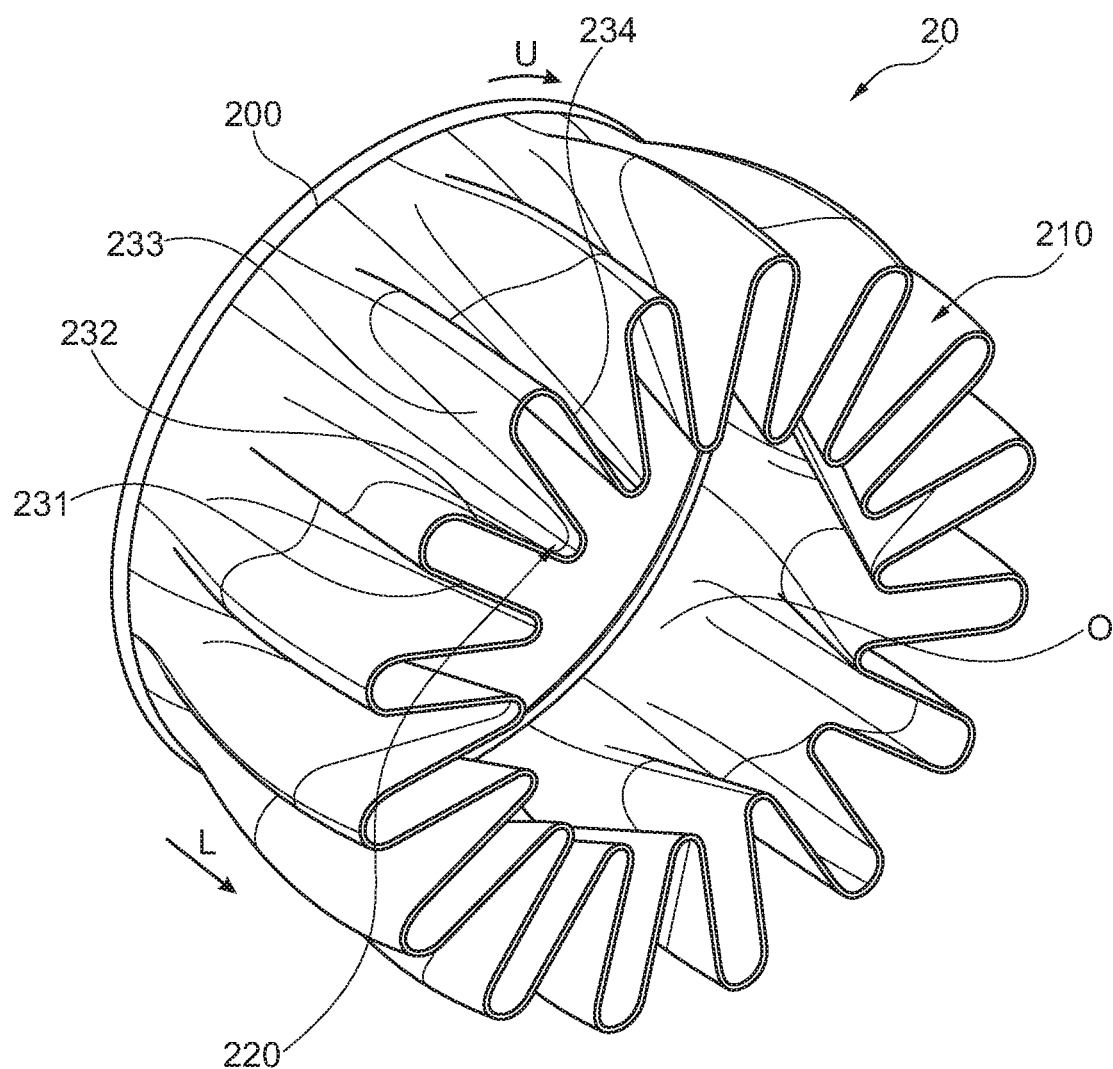
FIG. 1 shows a perspective view of an embodiment variant of a mixer according to the invention with a blossom-shaped or meander-shaped contour.

FIG. 1 shows the mixer 20 in perspective detail view. It extends in a longitudinal axis that coincides with the central axis M in a longitudinal direction L, which in the mounted state of the mixer 20 points in the direction of the exhaust A, and thus in the flow direction of the fluid flow f1 and f2. The different guide elements 210 and 220 of the mixer 20 extend in longitudinal direction L, starting from a front mixer edge 200 via which the fixation of the mixer 20 at the interface 21 is realized. The guide elements 210 and 220 are arranged alternatingly along a circumferential direction U and are alternatingly arched in a convex (in the case of the first guide elements 210) and a concave manner (in the case of the second guide elements 220).

Here, the first guide elements 210 are embodied so as to be respectively pointing radially outwards and thus in a diffusor-like manner, while the second guide elements 220 are formed so as to be pointing radially inwards and thus in a nozzle-like manner. Correspondingly, the fluid flow f1 from the core engine is guided radially outwards via the first guide elements 210, while the fluid flow f2 from the bypass channel B is guided radially inwards via the second guide elements 210, if the mixer 20 is mounted at the engine T according to the intended use.

Each first guide element 210 shares respectively one side wall 231, 232, 233 or 234 with an adjacent second guide element 220. Thus, a side wall 231-234 extends between a radially outermost section of a first guide element 210, i.e. up to a convex outer curvature 2100 of the first guide element 210, and a radially innermost section of a second guide element 220, i.e. up to a concave inner curvature 2200 of the second guide element. Due to the radially converging second guide elements 220 and axially diverging first guide elements 210, the radial extension of each side wall 231-234 (with respect to the longitudinal direction L of the mixer 20) is increased, starting from the mixer edge 200 in the direction of the exhaust-side end of the mixer 20.

Figure 2:
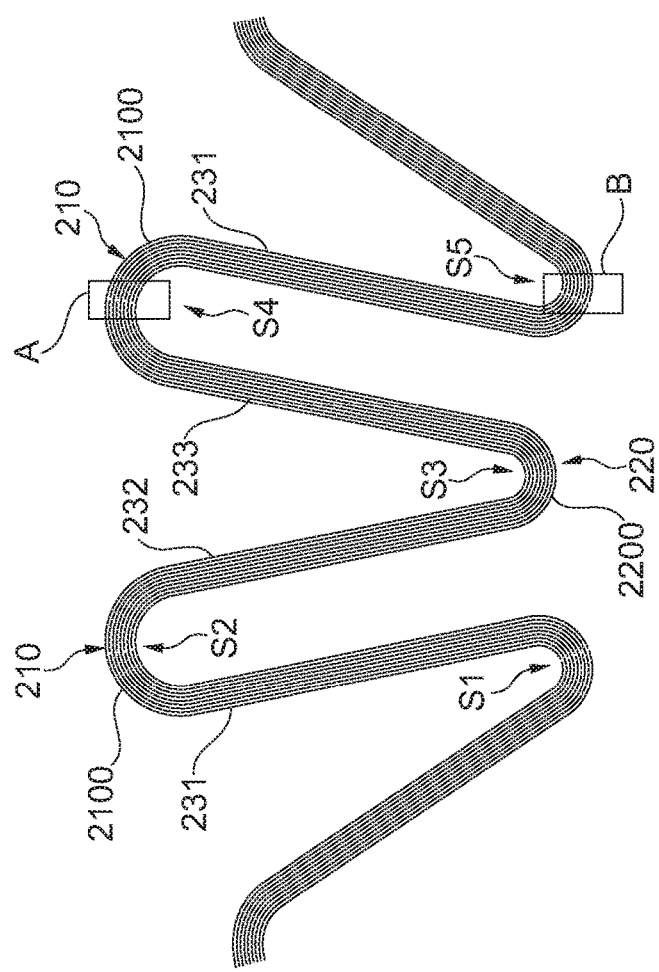
FIG. 2 shows, by sections, a cross-section of the mixer of FIG. 1, also rendering individual material layers that are arranged edge to edge.
Figure 2B:
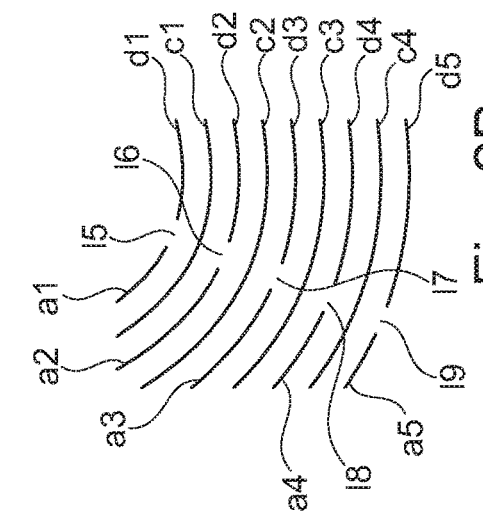
FIGS. 2A-2B show enlarged sections of the sectional view of FIG. 2.
Figure 2A:
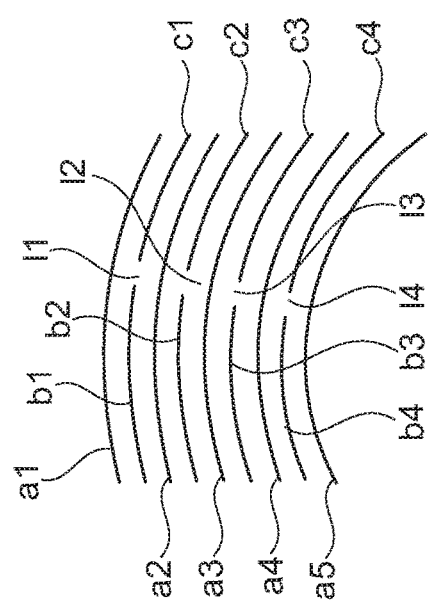

In the present case, the mixer 20 that is manufactured from a fiber-reinforced composite is formed from multiple batts with ceramic filaments and a matrix that possibly also contains ceramics as the CMC structural component. The mixer 20 has a multi-layered structure, and in a first embodiment variant is e.g. comprised of different material layers a1 to a5, b1 to b4, c1 to c4, and d1 to d5. This is illustrated in particular for the first embodiment variant based on FIGS. 2, 2A and 2B.

At their edges that are positioned in the circumferential direction U, multiple single material layers a1 to a5; d1 to d5 and b1 to b4; c1 to c4 that are formed of batts are arranged in pairs edge to edge in the axial direction. As for the material layers a1 to a5 and d1 to d5 as well as b1 to b4 and c1 to c4, that are arranged edge to edge and are thus butted together, a gap l1 to l9 that is possibly only a few μm wide is present between each pair of material layers which are arranged edge to edge. Thus, a reduced stiffness is provided in a targeted manner in a joint area S1-S5 of the respective gaps l1 to l9, which is associated with a greater elastic deformability of the mixer structure. Hence, a targeted stiffness reduction is obtained through the arrangement of the material layers a1 to d5 via the joint areas S1 to S5 at the convex outer curvatures 2100 and the concave inner curvatures 2200, without the wall thickness of the mixer 20 having to be reduced in a large planar area.

In the present case, the corresponding joint areas S1 to S5 are respectively provided in the area of the convex outer curvature 2100 and the concave inner curvatures 2200 of the first and second guide elements 210 and 220. Here, respectively multiple material layers are arranged in pairs edge to edge, wherein at the same time respectively multiple additional material layers extend beyond a corresponding gap l1 to l9 of two adjoining material layers, thus covering them. Thus, in the radial direction, for example material layers a1, b1, a2, b2, a3, b3, a4, b4, a5 alternate in pairs, of which respectively only every other material layer b1 to b4 is arranged, in the area of a convex outer curvature 2100 of a first guide element 210, edge to edge to a material layer c1 to c4 connecting to the same in the circumferential direction U. In contrast, the material layers a1 to a5 that adjoin thereto in the radial direction extend up to the next concave inner curvature 2200 of a second guide element 2200, only here adjoining an edge of a further material layer d1-d5. Thus, the material layers a1 to d5, although respectively extending with the same length in the circumferential direction U in the present case, are offset by layers with respect to one another in the circumferential direction U, so that material layers a1 to d5 adjoining each other in the radial direction end at different first and second guide elements 210, 220.

For example, the first material layers a1 to a5 between the joint areas S3 and S5 respectively completely span a first and second side wall 233, 231 as well as a convex outer curvature 2100 of a first guide element 210, and thus extend between two concave inner curvatures 2200 of two adjoining second guide elements 220. In contrast, the material layers b1 to b4 or c1 to c4, which are layered together with them, end in the joint area S4 of the convex outer curvature 2100 of the first guide element 210, and are butted together here. In contrast, in the circumferential direction U, these material layers b1 to b4 and c1 to c4 respectively span, starting from the joint area S4 at the convex outer curvature, the second guide element 220 that adjoins in the clockwise direction or the other second guide element 220 that adjoins in the counterclockwise direction as well as the respectively associated concave inner curvature 2200 at the joint area S3 or S5.

Figure 3:
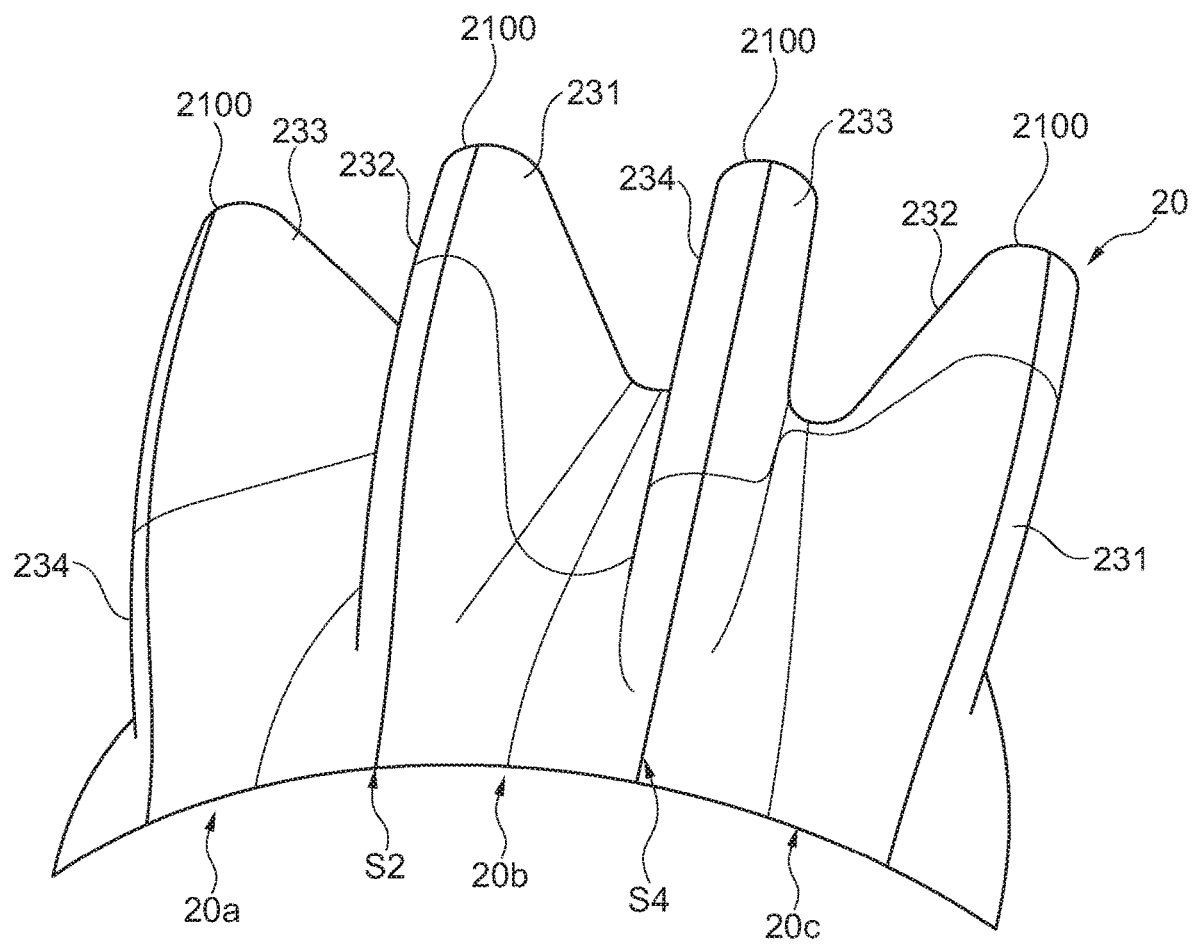
FIG. 3 shows, in a perspective view, a segment of the mixer of FIG. 1 that is comprised of multiple individual material layers, with material layers that are arranged axially edge to edge.
Figure 4:
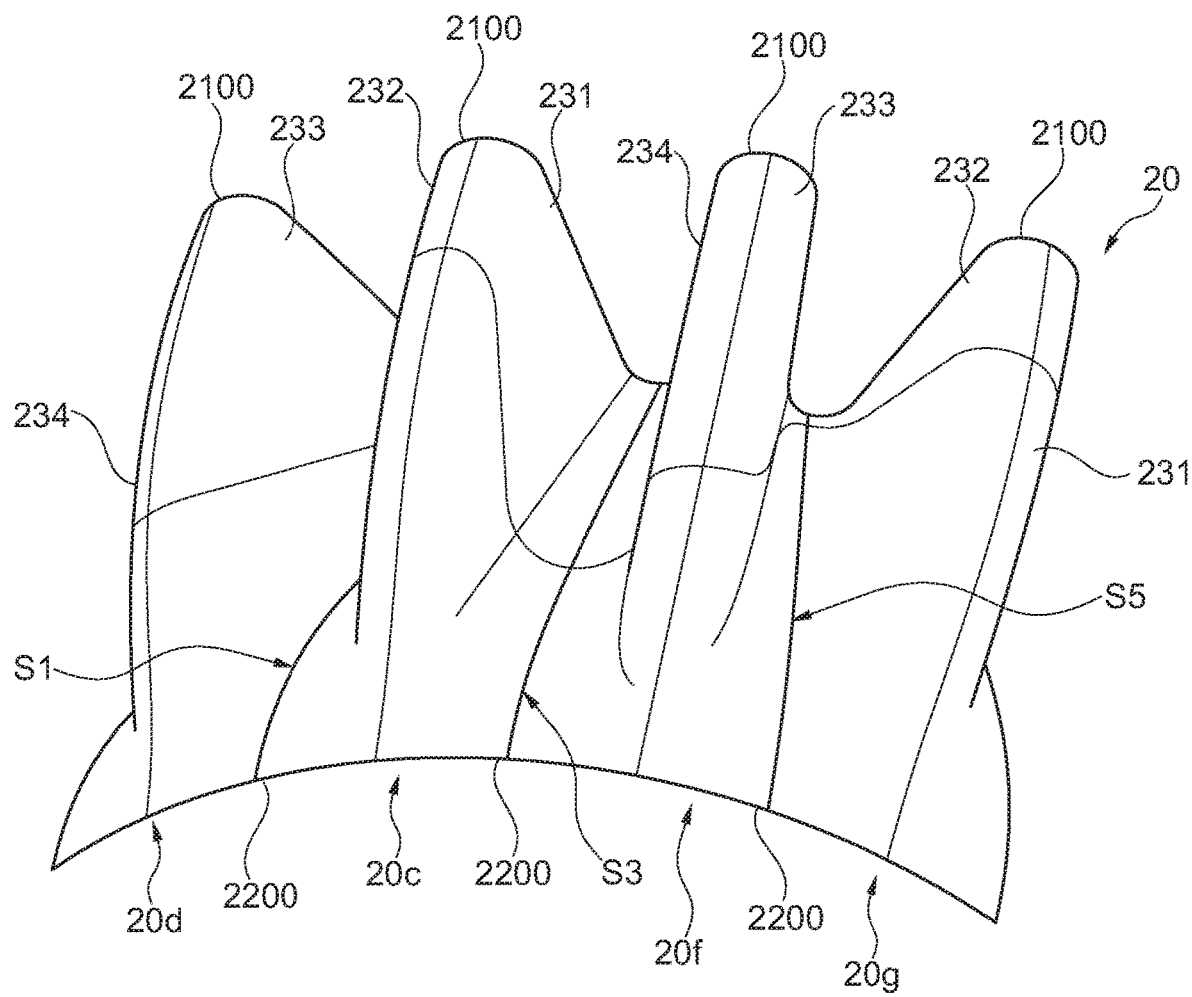
FIG. 4 shows a variant of the segment of FIG. 3 with an alternative edge-side arrangement of individual material layers.

Based on FIGS. 3 and 4, the material layers 20a to 20g, which are respectively formed by a batt, are illustrated. While in the variant of FIG. 3 individual batts 20a to 20c respectively define one single second guide element 220 and are arranged edge to edge to each other in the area of a convex outer curvature 2100 of adjoining first guide elements 210, the batts 20d to 20g of FIG. 4 form the individual guide elements 210 completely and are arranged edge to edge to each other in the area of the concave inner curvatures of second guide elements 220 adjoining thereto. Thus, if in the variant of FIG. 3 the joint areas S2 and S4 are provided in the flow direction and thus along the longitudinal direction L at the first guide elements that are arched in a convex manner and extended radially outwards, the joint areas S1, S3 and S5 are located at the concave inner curvatures 2200 of the second guide elements 220 and thus run radially inwards along the longitudinal direction L in the variant of FIG. 4. In both cases, a piece-by-piece construction of the mixer 20 can be carried out, in which areas of deliberately reduced stiffness are provided in a targeted way and in a manner evenly distributed across the circumference by means of a corresponding segmentation and thus formation of individual guide elements 210 and 220 that extend radially outwards or radially inwards.

In contrast, in the variant of FIGS. 5, 5A, 6 and 7, a targeted stiffening and thickening of the mixer structure is provided in the area of the convex outer curvatures 2100 and the concave inner curvatures 2200 by material layers that are overlapping at the edge side.

Here, material layer bondings L1-L8 are arranged so as to overlap in the axial direction at the edge side. However, in the present case respectively only one part of the material layers that are present here ends in the area of the respective arch 2100, 2200, so that also only that part overlaps at the edge side in the area of an arch 2100 or 2200. For example, the continuous wall of the mixer 20 is constructed from a total of m plus n material layers. Here, respectively m material layers are assigned to a first material layer bonding L1, L3, L5 or L7 z, while n material layers are assigned to a further material bonding L2, L4, L6 or L8. Then, the individual material layers of these material layer bondings L1 to L8 are present in a manner stacked on top of each other in the radial direction at each side wall 231-234. Respectively only two material layer bondings L1/L3, L2/L4, L3/L5, L4/L6, L5/L7 or L6/L8 end at an arch 2100 or 2200, with their material layers overlapping at the edge side, while a third material layer bonding L2, L3, L4, L5 or L6 with multiple material layers extends beyond the respective arch 2100 or 2200.

Correspondingly, overlapping areas OL13, OL24, OL35, OL46, OL57 and OL68 are respectively present in the area of the arches 2100 and 2200. In these overlapping areas OL13, OL24, OL35, OL46, OL57 and OL68, the structure of the mixer 20 is locally stiffened and thickened due to these material layers of a pair of material layer bondings L1/L3, L2/L4, L3/L5, L4/L6, L5/L7 or L6/L8 that overlap at the edge side, while at the same time material layers of a third material layer bonding L2, L3, L4, L5 or L6 are not interrupted in these overlapping areas OL13, OL24, OL35, OL46, OL57 and OL68. As a result, a local thickening of the mixer structures by 50% as compared to a respectively continuous arrangement of the material layers is tolerated in the area of the arches 2100 and 2200 across the entire length of the mixer 20 (along the longitudinal direction L) in the area of the first and second guide elements 210 and 220 in order to render manufacturing the mixer 20 by means of the segmented arrangement of the material layers easier, and also to introduce stiffening structures in a targeted manner.

As is shown based on the folded out rendering of FIG. 5A for a variant based hereon with a differing configuration or layering of the material layers, thickened areas are present in the respective overlapping areas OL46, OL57 and OL68 due to the material layers of two adjoining material layer bondings overlapping in pairs at the edge side. However, these thickened areas can for example be provided at an outer contour of the mixer 20 for the radially outwardly extending first guide elements 210, and at an inner contour of the mixer 20 in the radially inwardly extending second guide elements 220 in order to keep their influence on the fluid flows f1 and f2 as small as possible.

Figure 6:
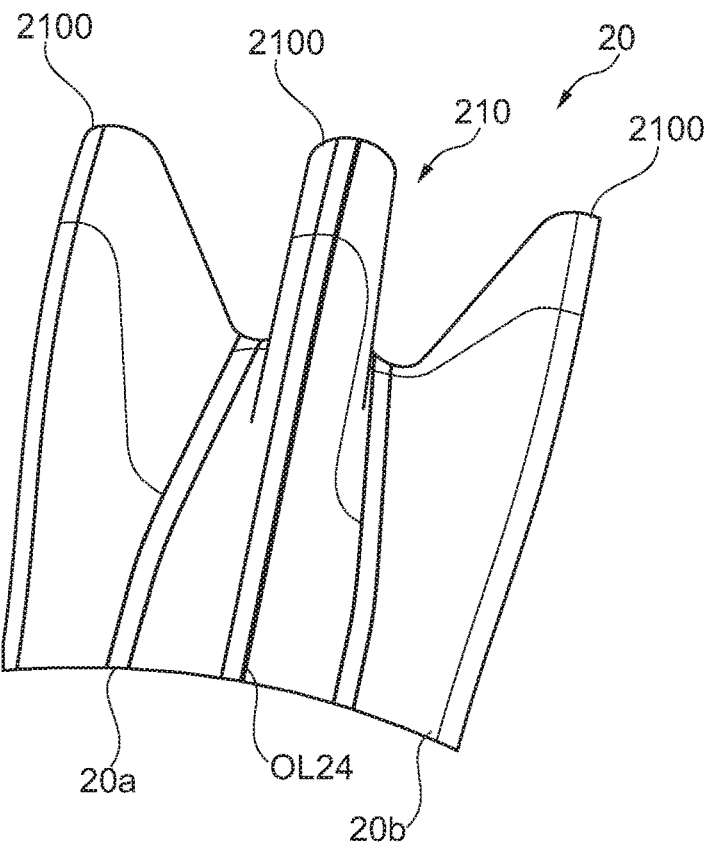
FIG. 6 shows, in perspective view, a segment of the mixer with two material layers that are overlapping axially along a lobe of the mixer and at the edge side.
Figure 7:
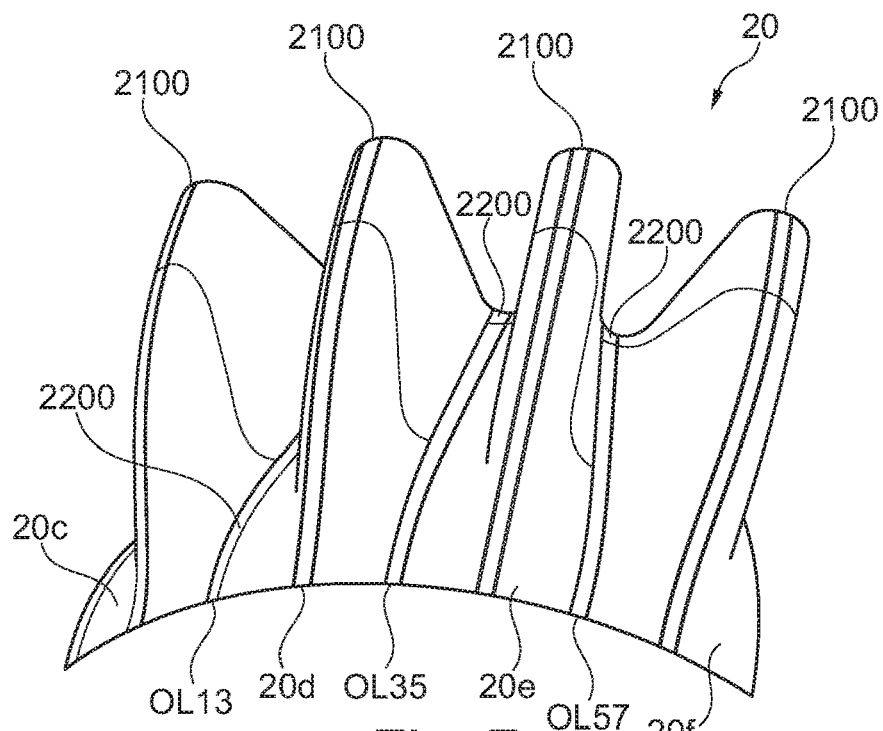
FIG. 7 shows, in a perspective rendering, a segment of the mixer with four material layers that respectively axially overlap in pairs along a gully of the mixer and at the edge side.

Based on FIGS. 6 and 7, possible variants for constructing the mixer 20 from individual batts 20a to 20f that are arranged in segments are illustrated in an analogous manner to FIGS. 3 and 4. Here, the material layers overlap in the area of the convex curvatures 2100 of the first guide elements 210 and thus at the lobes of the mixer 20, or in the area of the concave inner curvatures 2200 of the second guide elements 220 and thus at the gullies of the mixer 20, respectively at the edge side.

Figure 8:
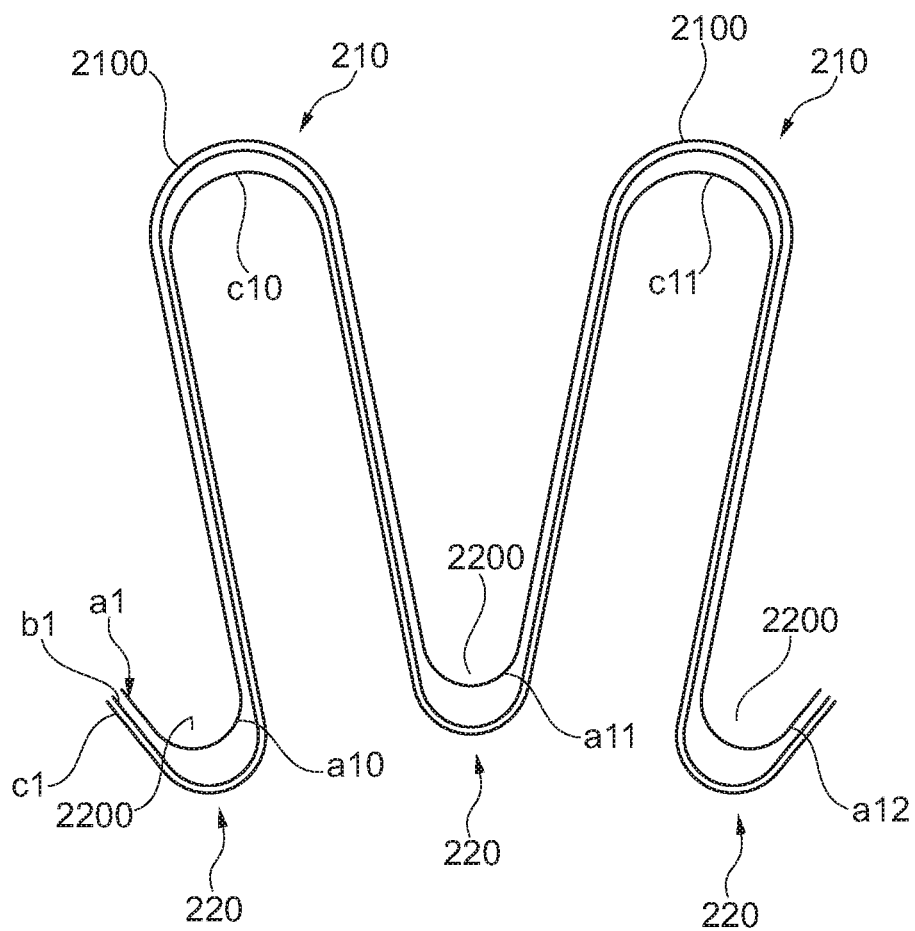
FIG. 8 shows, by sections, a cross-sectional rendering of a mixer with three material layers corresponding to a further embodiment variant.

Depending on the size of the batts for forming the individual material layers a1, b1 and c1 that are stacked on top of each other, they can of course also extend across multiple radially outwardly extending first and radially inwardly extending second guide elements 210, 220 of the mixer 20. Correspondingly, a segment of the mixer 20 that is shown in FIG. 8 and that can for example be manufactured with a manufacturing tool 3 of FIG. 9 has three exemplary material layers a1, 131 and c1. Here, respectively one inner section a10, a11 or a12 of a radially outer material layer a1 at a concave inner curvature 2200 at the outer side, as well as respectively one inner section c10 or c11 of a radially inner material layer c1 at a convex outer curvature 2100 at the inner side form a local thickening of the wall of the mixer 20. However, such a thickening respectively has no (relevant) influence on the flow along the respective inner section a10 to a12 or c10, c11.

Figure 9:
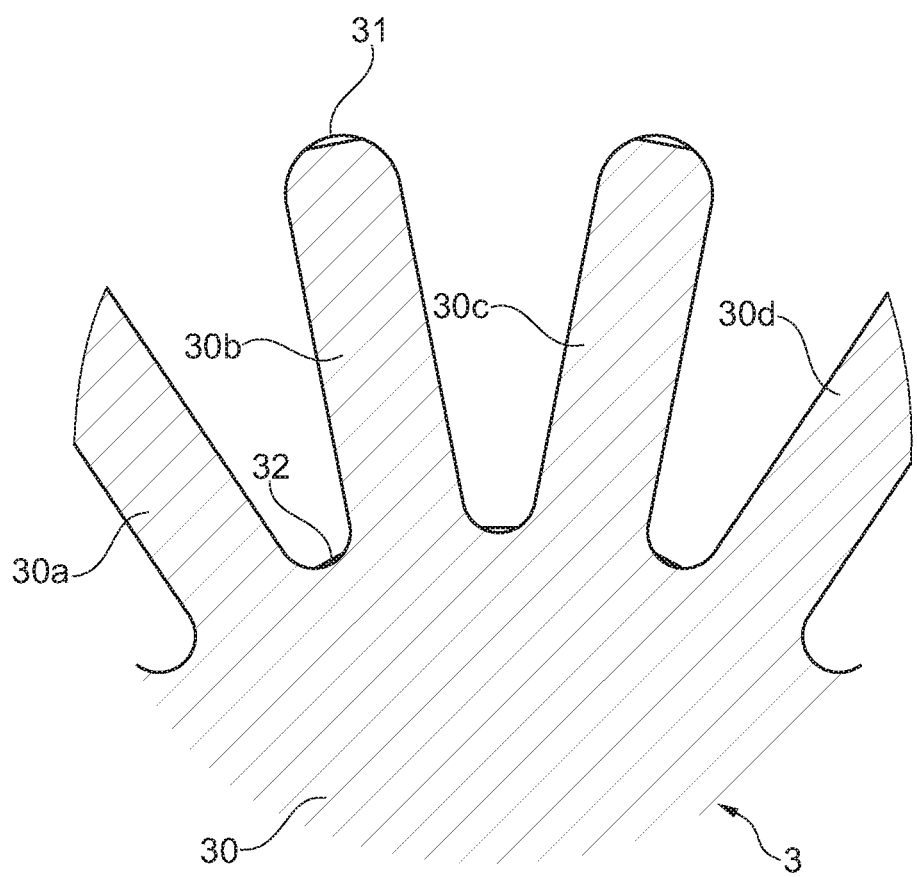
FIG. 9 shows, by sections, a sectional view of a manufacturing tool for manufacturing a mixer corresponding to FIG. 8.

For manufacturing the mixer 20 from individual material layers that do not extend across the entire circumference of the mixer 20, a positive mold may for example be provided as the manufacturing tool 3, which has a base body 30 with radially outwardly protruding radial arms 30a to 30d, in a manner corresponding to FIG. 9. These radial arms 30a to 30d, with the gaps lying in between them and having a funnel-shaped cross-section, define the blossom-shaped or meander-shaped contour of the mixer to be manufactured 20. The individual material layers or material layer bondings are correspondingly arranged at an outer contour of the corresponding manufacturing tool 3, for example they are draped thereat in a suitable manner, before subsequently a curing process is performed, for example by introducing the matrix material between the fibers by infiltration with a resin material and/or thermal treatment of the material layers.

In order to be able to provide a local thickening and stiffening by means of material layers that are overlapping at the edge side in the area of the convex curvature 2100 and the concave inner curvature 2200 without substantially increasing the wall thickness of the mixer structure as compared to a material layer arrangement without a corresponding overlapping, the manufacturing tool 3 is provided with a compensation contour in the area of a radially outermost section of each radial arm 30a to 30d, as well as at a radially innermost section of the respective gap lying between them. This may for example be a flattened section or material recess in the area of the radially outermost sections of the radial arms 30a to 30d or a material thickening 32 in the area of the funnel-shaped gaps formed between the protruding radial arms 30a to 30d. In this way, the material layers draped onto the corresponding manufacturing tool 3 form a contour at the respective overlapping areas OL13 to OL68, that shows only a minor local thickening and barely influences the fluid flows f1 and f2 guided through these areas, or does not influence them at all.

Figure 10:
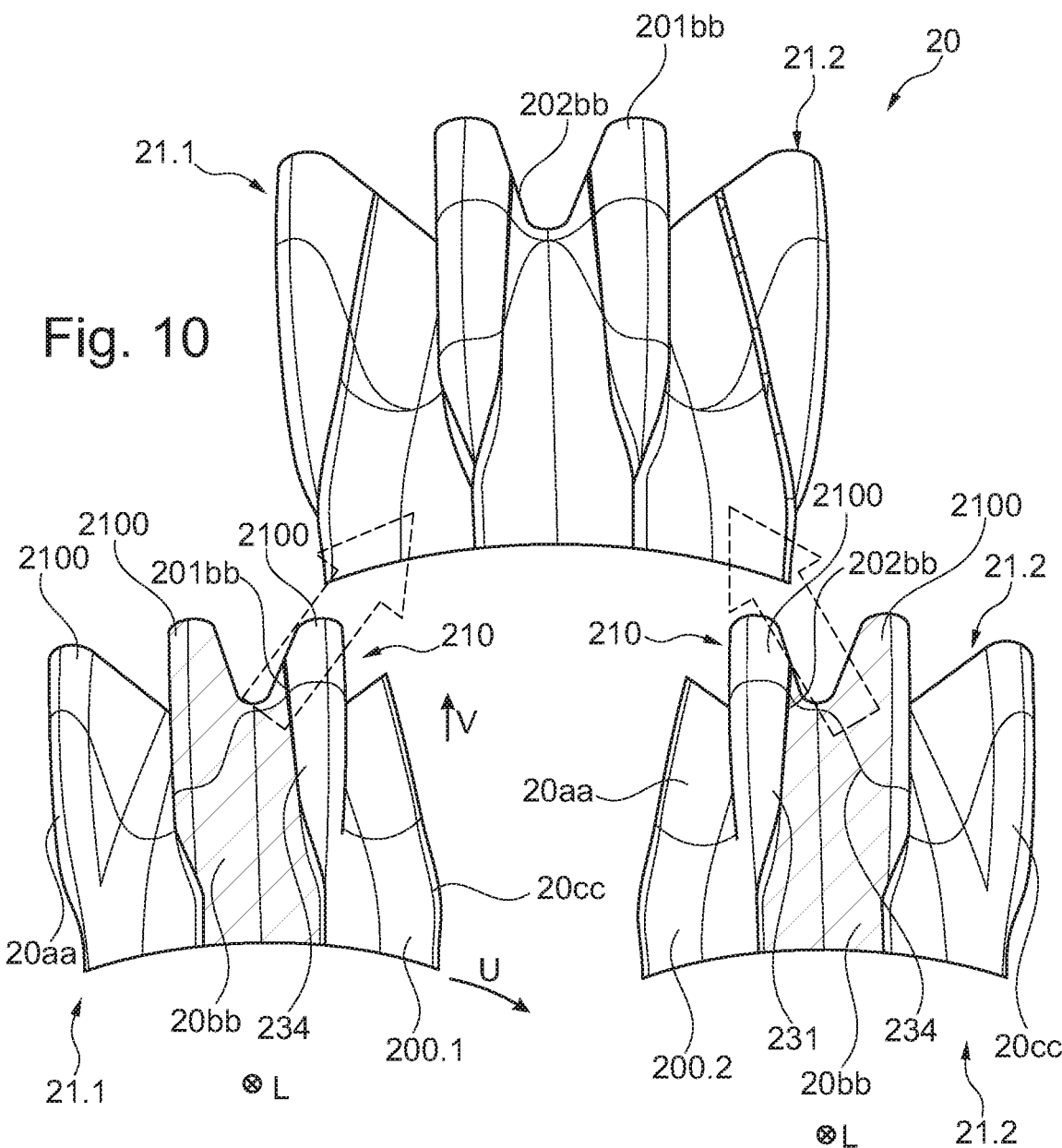
FIG. 10 shows a section of the mixer of FIG. 1 with different mixer segments from material layers overlapping each other at the edge side along a spline.

With a view to a possible stability-oriented arrangement of the overlapping areas of at least two material layers it can also be provided in one embodiment variant that the overlapping edge rims do not (throughout) extend in parallel to the longitudinal direction L or the central axis M. In the embodiment variant illustrated in FIGS. 10, 10A and 10B, the edge rims 201bb and 202bb of the overlapping material layers 20aa to 20cc extend in the three-dimensional space and in a curved manner with respect to at least two spatial axes that are perpendicular to one another. Here, a section of the mixer 20 with multiple first and second guide elements 210, 220 is formed by two mixer segments 21.1 and 21.2 that respectively comprise multiple (in the present case three) material layers 20aa to 20cc that overlap in pairs at the edge side.

At that, the individual material layers 20aa to 20cc define respectively one edge segment 200.1 or 200.2 for the mixer edge 200 and (just like the segments of the previous embodiment variants) extend across the entire axial length of the mixer 20. In contrast to the above-described embodiment variants, the overlapping edge rims 201bb and 202bb do not extend in an axially linear manner, but respectively have a course that, in addition to an axial directional component, also has a directional component in the circumferential direction U as well as a directional component in the radial direction r with respect to the central axis M of the finished mixer 20. Thus, the individual edge rims 201bb and 202bb extend in the manner of a spline, so that a starting point of an edge rim 201bb or 202bb that is located upstream in the area of the respective edge segment 200.1 or 200.2 is offset with respect to at least one further point of the respective edge rim 201bb or 202bb that is located downstream in longitudinal direction L regarding all three spatial directions that are perpendicular to each other. For example, in an edge rim 201bb of a material layer 20bb that is shown in FIG. 10A, a left-side curvature, on the one hand, and a radially outwardly oriented curvature of the edge rim 201bb, on the other hand, is provided, with a view along the longitudinal direction L beginning at a starting point at the edge segment 200.1. In contrast, in an edge rim 202bb that is shown in FIG. 10B, a right-side curvature, on the one hand, and a radially outwardly oriented curvature, on the other hand, is provided.

Figure 11:
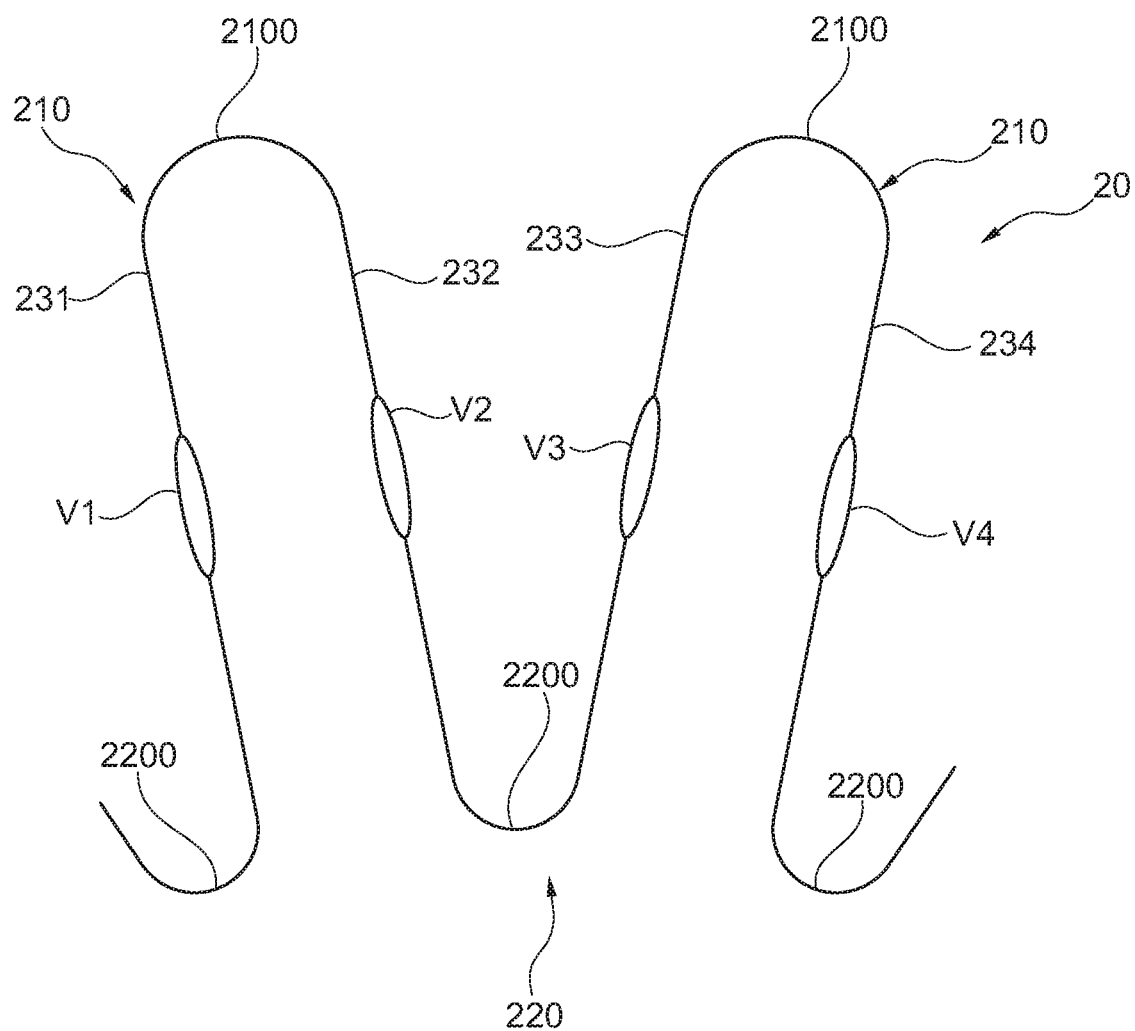
FIG. 11 shows, by sections and in a schematic manner, a sectional view of the section of FIG. 10.

The individual mixer segments 21.1 and 21.2 that are respectively comprised of multiple material layers 20aa to 20cc are brought into abutment at a manufacturing tool 3 so as to overlap each other, so that respectively two material layers 20bb/20aa and 20cc/20bb of the two mixer segments 21.1 and 21.2 overlap in a large planar area at least at two first guide elements 210. In this manner, additional three-dimensionally extending overlapping areas are provided at the edge rims 201bb and 202bb along both sides of a first guide element 210 that is arched in a convex manner. In particular at the per se even side walls 231-234 that are located opposite each other along the circumferential direction U, local thickenings V1 to V4 are created approximately centrally, extending in the axial direction and locally stiffening the mixer structure without any disruptive influence on the fluid flow f1 and f2 that is guided via the mixer 20. This is in particular illustrated by way of example based on the sectional view of FIG. 11.

Figure 12:
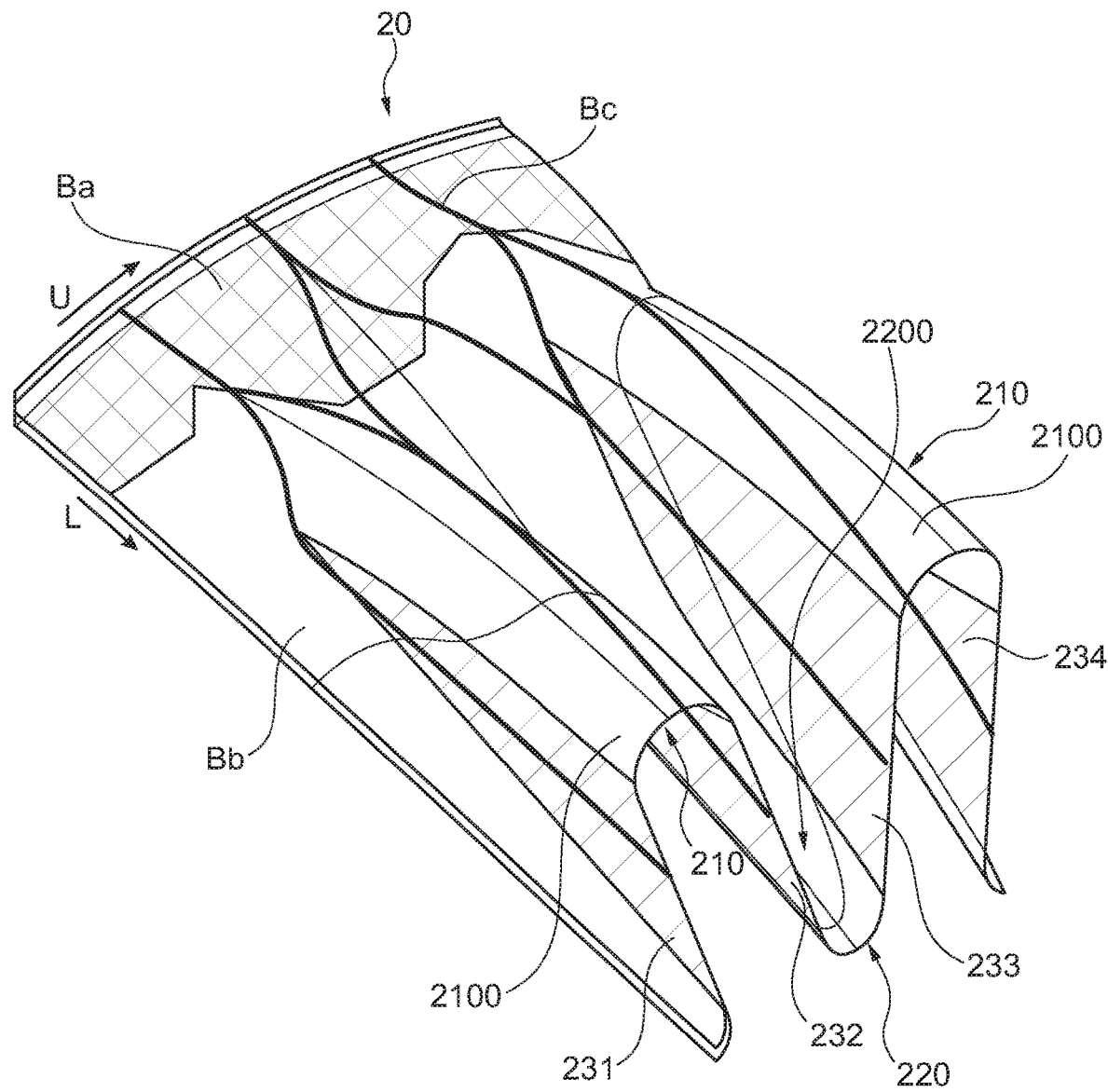
FIG. 12 shows, by sections and in a perspective view, a segment of the mixer with an illustration of areas of different stiffness.
Figure 13A:
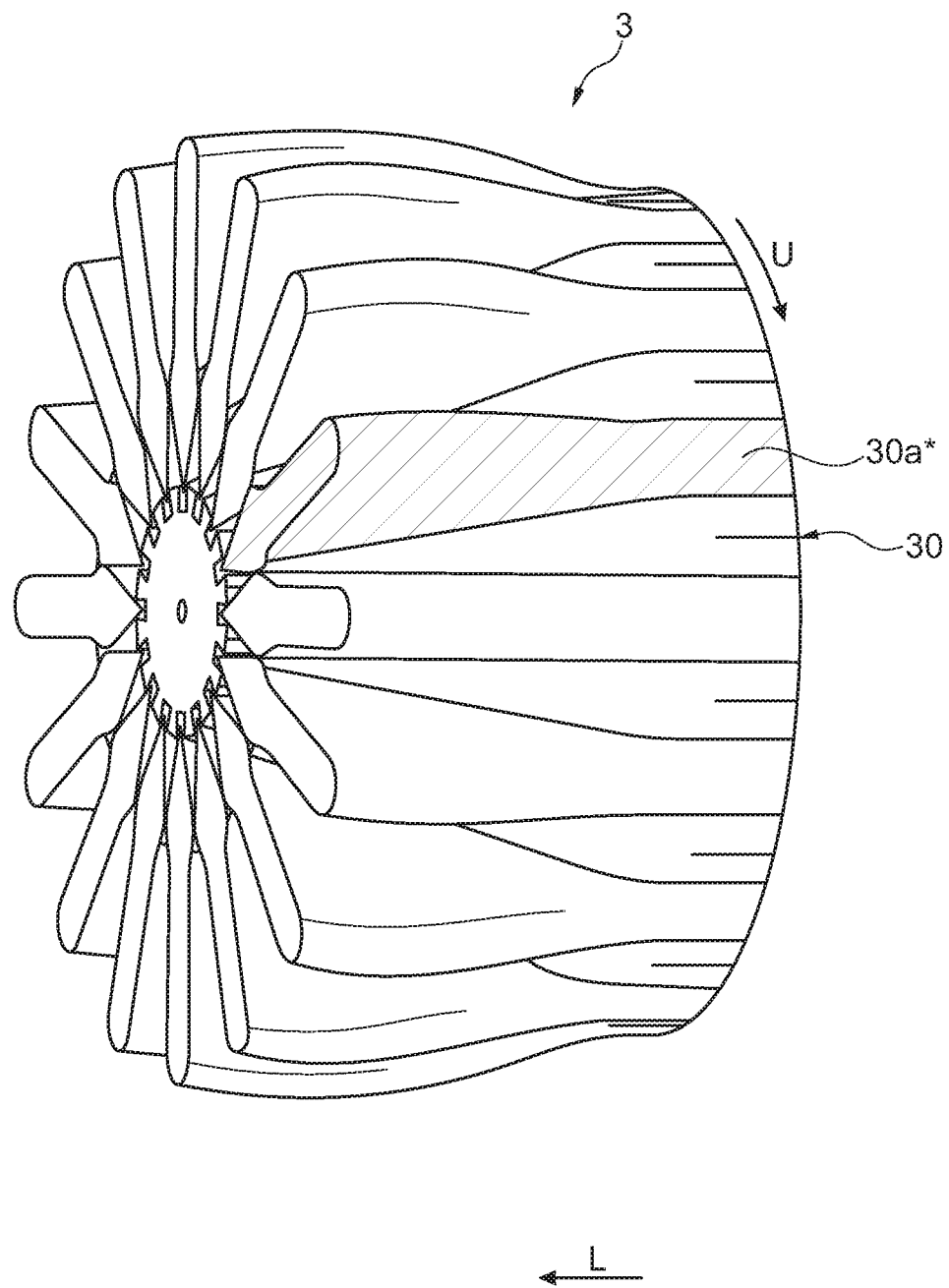
FIGS. 13A to 13E show, in different views, an embodiment variant of a manufacturing tool according to the invention as a positive mold for a mixer of FIG. 1 that is to be manufactured.
Figure 13B:
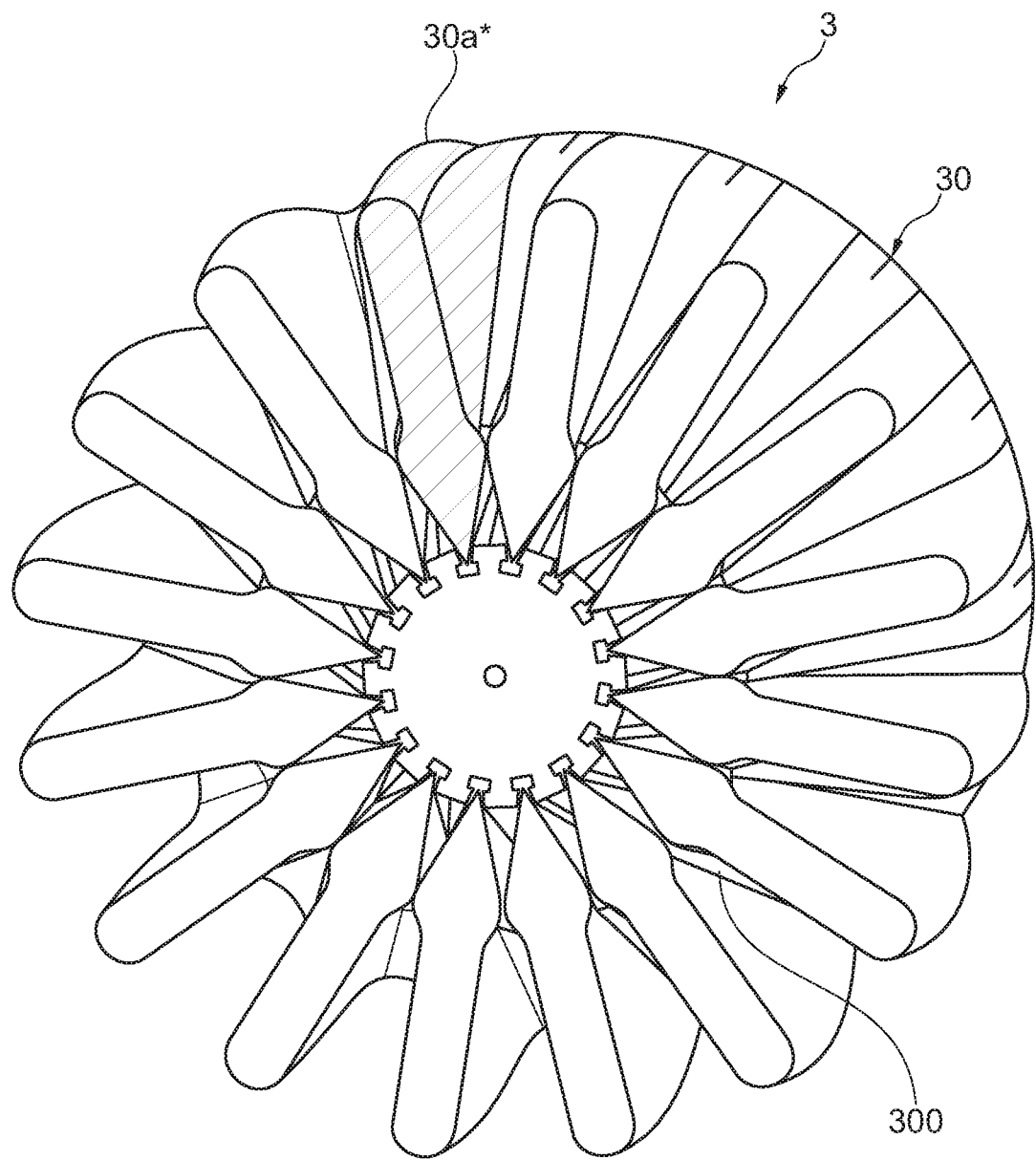
Figure 13C:
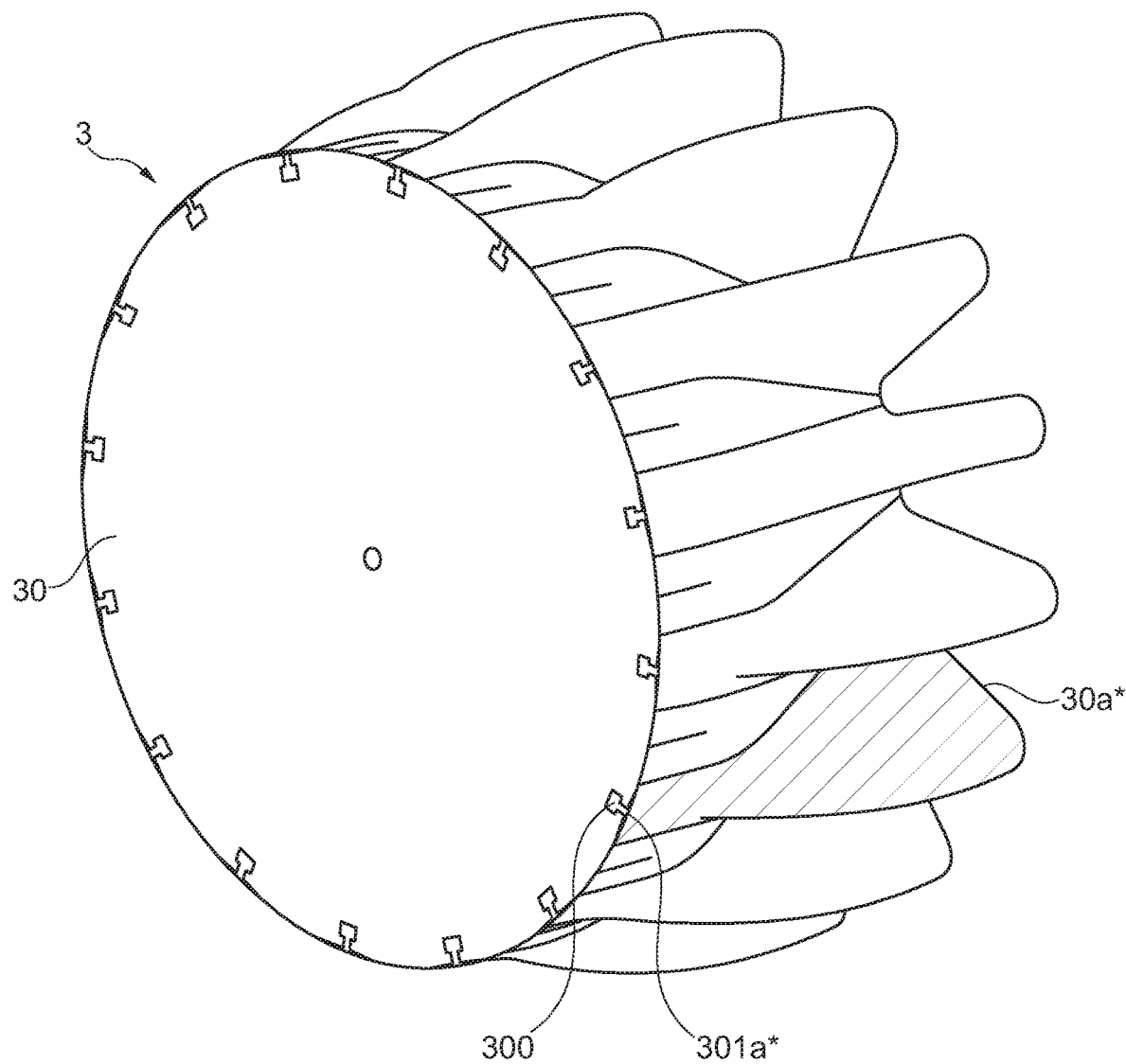
Figure 13D:
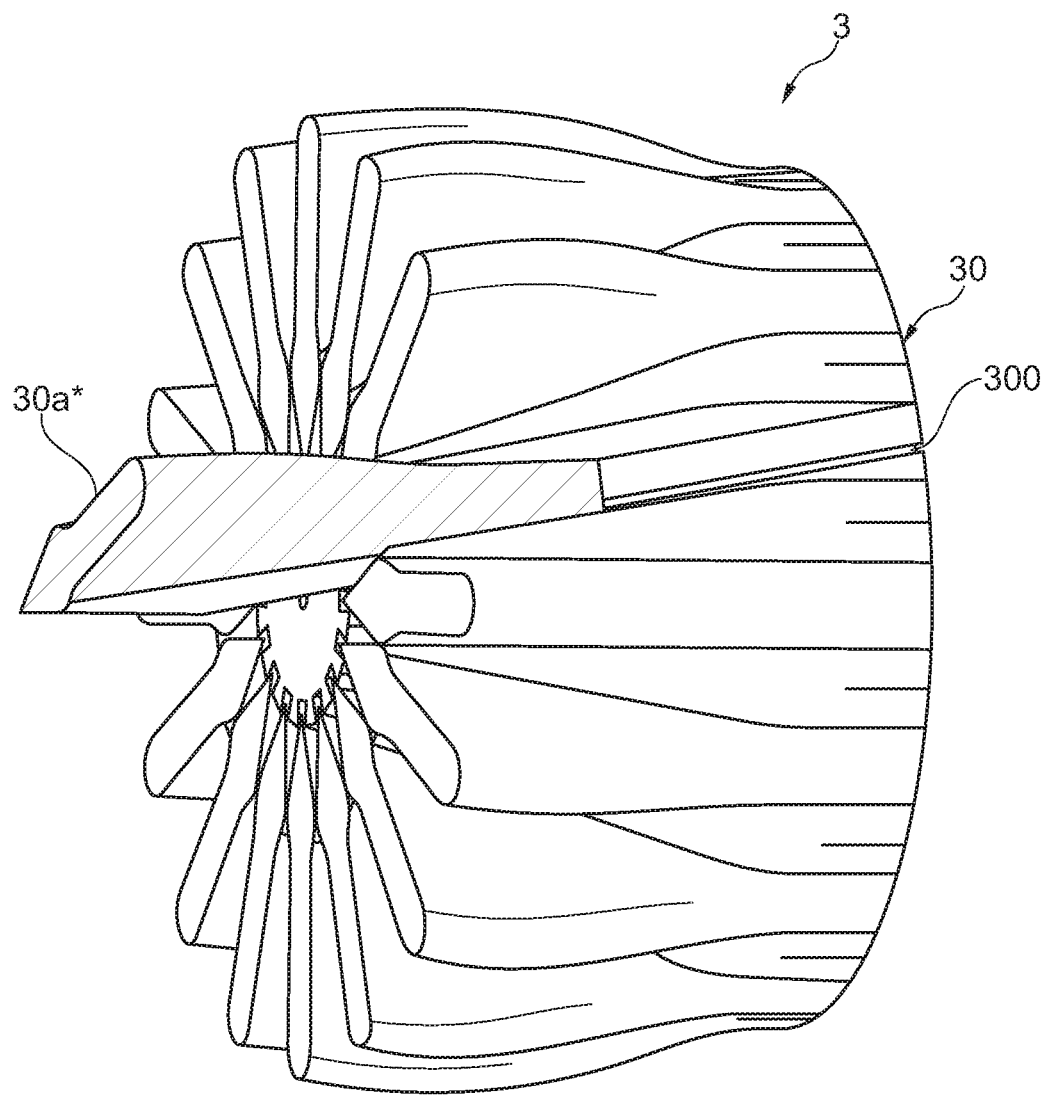
Figure 13E:
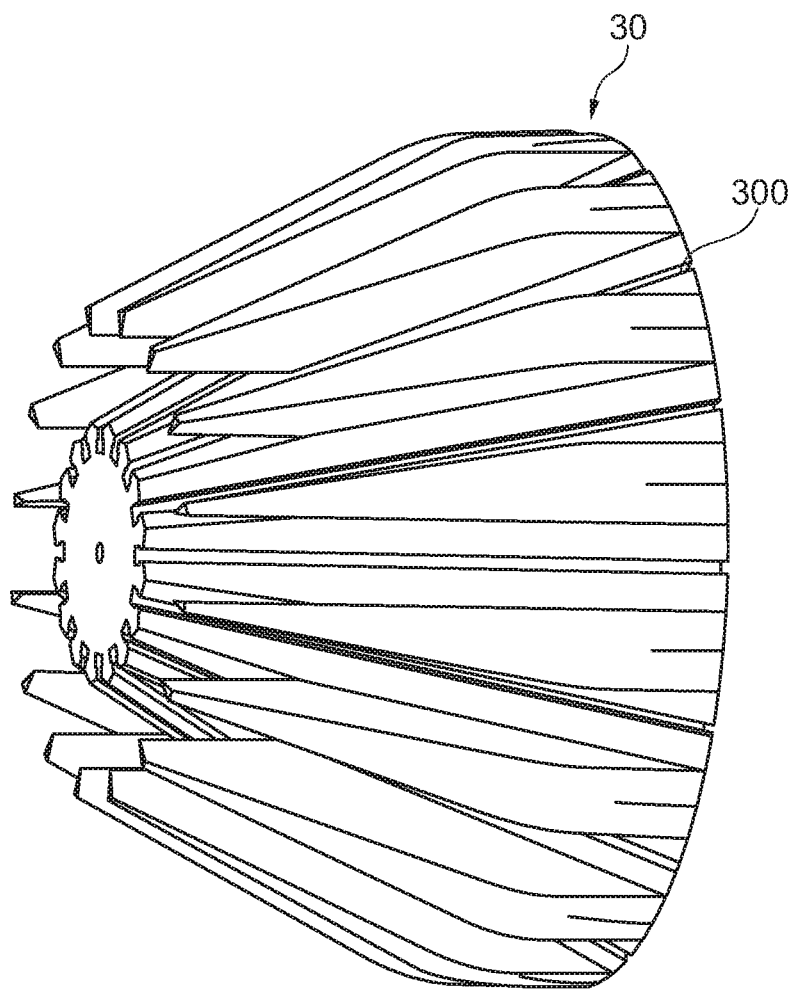

A segment of the mixer 20 shown in FIG. 12 further illustrates the material areas Ba, Bb and Bc of different stiffness that are defined at the mixer 20 by the corresponding arrangement and in particular through the edge-side overlappings of single material layers. A mostly small curvature of the material and a low stiffness is provided in an area that is close to the mixer edge, and also across a larger part of the side walls 231-234 (material area Ba). In a further material area Bb, which comprises the convex outer curvatures 2100 and the concave inner curvatures 2200 of the two first and second guide elements 210 and 220, respectively one area with an increased stiffness is formed by means of the material layers of the ceramic matrix composite that are stacked on top of each other. In material areas Bc, which extend across the axial length of the mixer 20 and on both sides of a convex outer curvature 2100 at opposing side walls 231, 232 and 233, 234, a local stiffening is provided by material layers that overlap at the edge side.

A manufacturing tool 3 that is illustrated in FIGS. 13A to 13E can in particular be used for manufacturing a mixer 20 that is constructed of segments in a manner corresponding to the previously explained embodiment variants. At that, the manufacturing tool 3 models the contour of the mixer 20 as a positive mold, so that material layers in the form of batts that are draped at the outer contour of the manufacturing tool 3 yield the desired blossom-shaped or meander-shaped contour of the mixer 20. The manufacturing tool 3 correspondingly extends along a longitudinal direction L and has radially protruding radial arms 30a*, that emulate the contour of the radially outwardly extending first guide elements 210. At that, the individual radial arms 30a* are respectively supported in a form-fit manner at a base body 30 that emulates the radially inwardly extending second guide elements 220 of the mixer 20 via the gaps defined between the individual radial arms 30a*.

In the present case, the base body 30 of the manufacturing tool 3 tapers off along a longitudinal direction L, while the individual radial arms 30a* taper off counter to the same, so that the corresponding contour of the mixer 20 is emulated. In order to facilitate demolding of the mixer 20 that is curing at the manufacturing tool 3, the individual radial arms 30a* are respectively supported at the base body 30 in a longitudinally displaceable manner. Thus, for demolding the mixer 20, each radial arm 30a* can be separated from the base body 30 in the longitudinal direction L. For this purpose, the base body 30 forms multiple longitudinally extending fastening grooves 300. Respectively one longitudinally extending fastening web 301a* of a radial arms 30a* is inserted into each fastening groove 300 in the manner of a dovetail joint when the components of the ceramic matrix composite are arranged at the manufacturing tool 3 for manufacturing the CMC mixer 20.

The base body 30 and/or the radial arms 30a* that can be inserted thereat can for example be manufactured from a material that has a thermal expansion coefficient of more than $17/10^{-6}$ K. For example, a corresponding manufacturing material can comprise aluminum. After the manufacturing tool 3 has cooled off, the base body 30 and/or the respective radial arm 30a* shrinks as well, whereby demolding of the cured mixer 20 is considerably facilitated.

What is further illustrated based on FIGS. 14 to 19 is an embodiment variant of a possible manufacturing method, in which the manufacturing tool 3 of FIGS. 13A to 13E is also made use of, where appropriate, and by means of which in particular a mixer 20 of the previously described embodiment variants can be manufactured.

Within the scope of the shown embodiment variant, a mixer with a blossom-shaped or meander-shaped contour corresponding to FIG. 14 is virtually divided into a plurality of individual mixer segments 21.1, of which one is shown by way of example in FIG. 15, in a computer-aided and automated manner by means of a software. Subsequently, it is determined by means of an algorithm with how many material layers 20aa to 20dd the corresponding mixer segment 21.1 can be created, with at least one design parameter being specified, for example the position and the spatial course of the local stiffening due to material layers overlapping at the edge side is determined in an automated manner. This respectively also includes the specification as to which geometry the individual material layers 20aa to 20dd corresponding to FIGS. 16A to 16D should have for this purpose.

In a subsequent simulation step, it is determined in a manner corresponding to FIGS. 17A to 17D and 18A to 18D how the individual material layers 20aa to 20dd have to be arranged on a for example rectangular material surface, so that they can be cut out from the material surface with as minimal offcuts as possible. Consequently, the corresponding algorithm for example determines in which order the individual material layers 20aa to 20dd have to be virtually arranged on the material surface, so that as little fiber material as possible remains unused in the cutting-out procedure. The usable material surface for example results from rolling out a tissue or fiber roll FR in a manner corresponding to FIG. 19. In this way, an arrangement of sectional lines CA on the material surface of the fiber roll FR is specified and electronically transmitted to a corresponding processing device, for example in a computer-aided and automated manner, with the processing device subsequently cutting out the individual material layers 20aa to 20dd from the material surface along these sectional lines. Subsequently, the thus created material layers 20aa to 20dd are draped according to the calculations at a manufacturing tool, such as for example the manufacturing tool 3 of FIGS. 13A to 13E to form the individual mixer segment 21.1 of FIG. 15.

The material layers 20aa-20dd can be so-called dry batts or impregnated batts with ceramic filaments. Depending on the fiber material that is used as the basis, different further process steps for curing and thus for finishing the mixer 20 can be provided. Possible variants are illustrated by way of example based on FIGS. 20 to 23.

Figure 20:
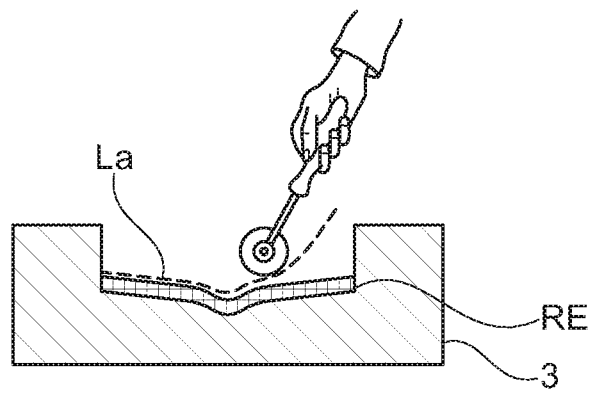
FIGS. 20 to 23 show a schematic rendering of possible methods for carrying out a curing in the manufacturing of the mixer.
Figure 21:
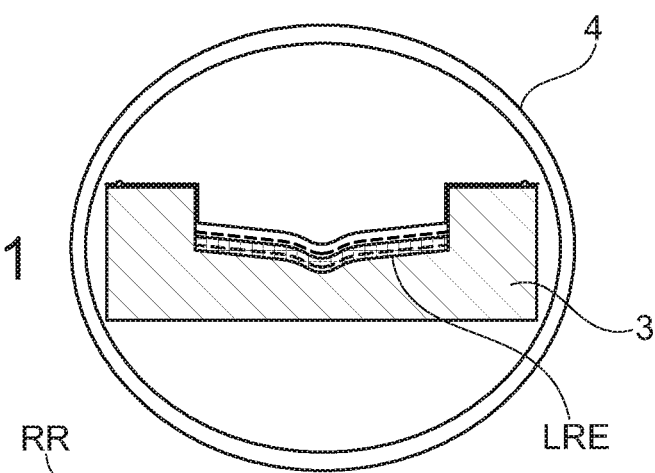

For example, the individual material layers can be positioned as a layer bonding LA in a manufacturing tool 3 that is used as a positive or negative mold in a manner corresponding to FIG. 20. The corresponding material layer bonding La is then already imbued by layers with a corresponding matrix material, e.g. resin. For the purpose of curing, any present air locks are pressed out of the material layer bonding (laminate) La that is arranged at the manufacturing tool 3, and a heat treatment is performed.

If a pre-impregnated batt and an impregnated layering LRE that is formed with the same is used, an autoclaving process can be realized as part of the curing procedure. Here, the curing is performed by using an autoclave 4 that is shown schematically in FIG. 21.

Figure 22:
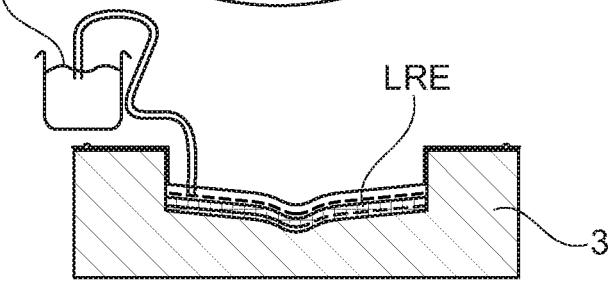

FIG. 22 illustrates, in a schematic manner, a curing process by using an infusion method, for example a so-called VAR® or VARI method, in which a matrix material, for example a resin, is supplied from a matrix reservoir RR to a layer bonding LRE that is arranged under vacuum in the manufacturing tool 3.

Figure 23:
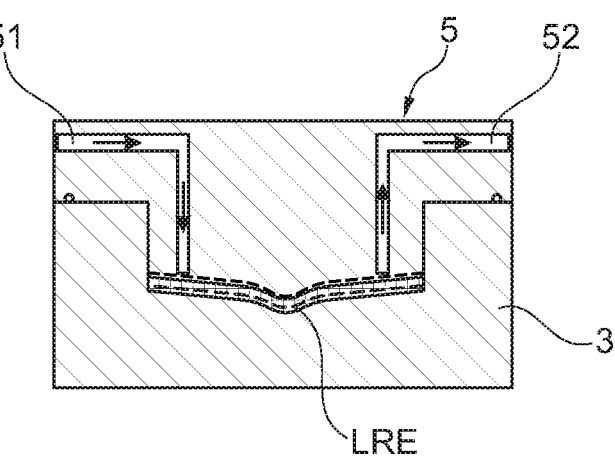

In contrast to that, in the injection method that is shown based on FIG. 23, e.g. an RTM method, matrix material is supplied to a layer bonding LRE arranged between two tool parts via an inlet 51 of an injection tool 5, wherein excess matrix material and any outgassing are discharged via a drain 52 of the injection tool 5.

With the provided layered and/or segmented structure of a mixer 20 with a blossom-shaped or meander-shaped contour preferably from a ceramic fiber-reinforced composite, different curing methods, in particular such as are corresponding to FIGS. 20 to 23, can be realized in an unproblematic manner by means of different manufacturing tools 3, 3inv that model the contour of the mixer 30 as a positive or negative mold. Here, a simplified demolding of the mixer 20 is in particular obtained by means of longitudinally displaceable radial arms 30a* or 30inv of the respective manufacturing tool 3, 3inv.

FIGS. 24 and 24A once more illustrate a manufacturing tool 3 with a conical base body 30 at which radially protruding radial arms 30a* are supported in a displaceable manner for defining the first and second guide elements 210 and 220 of the mixer 20. At that, the individual material layers are arranged as (a) layer bonding(s) La at the outer contour of the manufacturing tool 3, for example in a manual or mechanical manner by means of pre-impregnated batts or dry batts.

A manufacturing tool 3inv corresponding to FIGS. 25 and 25A predefines a negative mold. Here, the manufacturing tool 3inv surrounds a hollow space in the shape of a circular ring that defines the mixer opening O of the mixer 20 to be manufactured and into which radial arms 30inv project radially inward. Together with the gaps lying in between them, these radial arms 30inv define the outer contour of the second guide elements 220 as well as of the first guide elements 210 of the mixer 20. Thus, in this variant, a material layer bonding La is arranged at the inner side along the inner contour of the manufacturing tool 3inv in order to manufacture the mixer 20 in one piece. Here, too, the individual radial arms 30inv are longitudinally displaceable, so that demolding of the mixer 20 is considerably facilitated.

Figure 26:
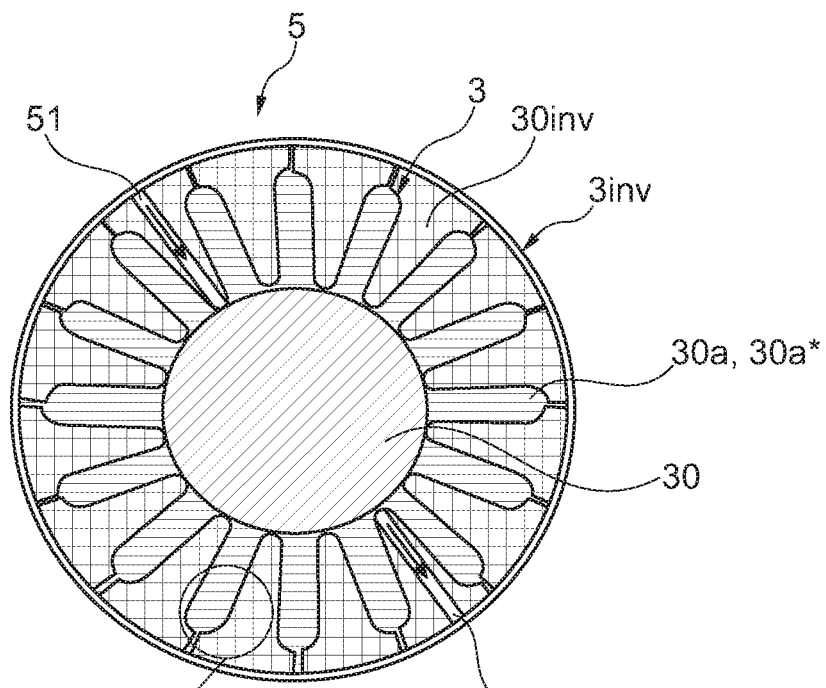
FIGS. 26 to 26A show a schematic illustration of a further embodiment variant of a manufacturing method according to the invention, in which an injection method is used as part of the curing.
Figure 26A:
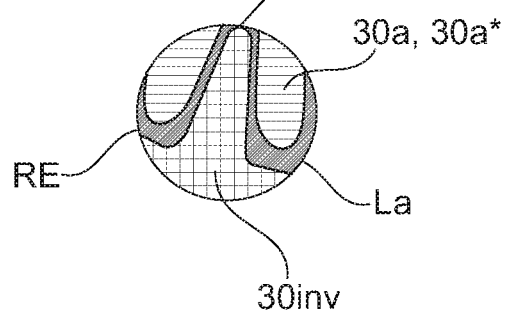

In the injection tool 5 of FIGS. 26 and 26A, the two manufacturing tools 3 and 3inv are combined with each other. The manufacturing tools can for example be inserted into each other, so that the one manufacturing tool 3 forms an inner tool part and the other manufacturing tool 3inv forms an outer tool part. In that case, the two manufacturing tools 3 and 3inv define a circumferentially continuous hollow space in between them, with its contour corresponding to the contour of the mixer 20. Before the two manufacturing tools 3 and 3inv are joined together, the individual material layers are arranged at the outer contour of the manufacturing tool 3 or at the inner contour of the manufacturing tool 3inv that is formed in an inverted manner with respect to the former. After the two manufacturing tools 3 and 3inv have been connected, the matrix material RE, for example in the form of a resin, is supplied via the inlet 51 of the injection tool 5. After a corresponding curing process, the mixer 20 is present as a structural component from ceramic fiber-reinforced composite formed in one piece and can be removed from the injection tool 5.

Figure 28:
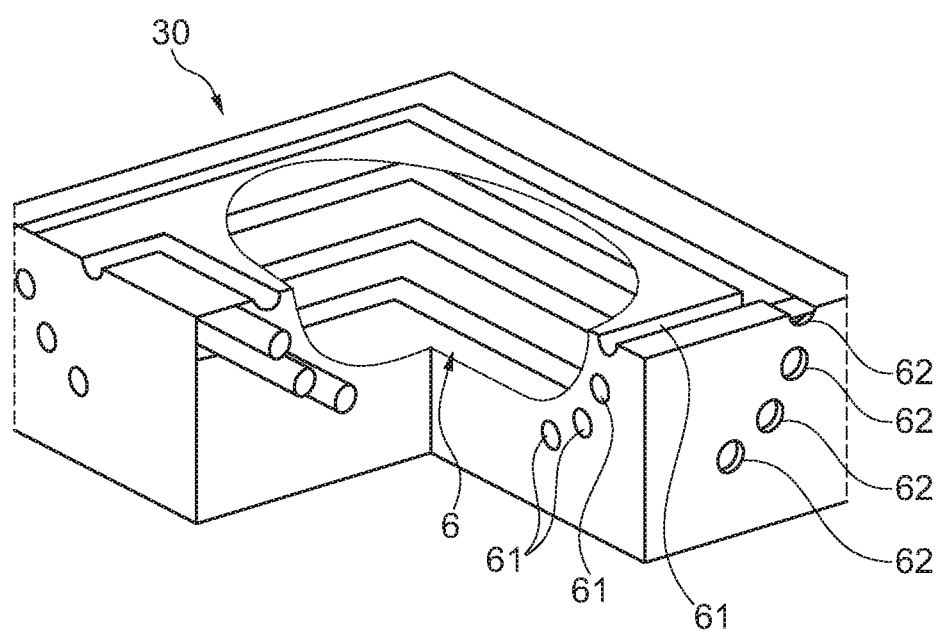
FIG. 28 shows a section of a manufacturing tool with a channel system integrated therein.

FIG. 28 shows a section of the base body 30 of the manufacturing tool 3 or 3inv. The base body 30, which is shown in sections here, has a channel system 6 for manufacturing a mixer 20 with side walls 231-234 of the first and second guide elements 210, 220 that extend in parallel to each other in the axial direction. The channel system 6 serves for the targeted heating and/or cooling of the manufacturing tool 3, 3inv by means of a fluid, e.g. water or oil, so that the base body 30 can be effectively cooled and shrunk, for example following curing of the mixer 20, in order to render demolding easier. In the present case, the channel system 6 has multiply branched fluid channels 61, 62 that extend through the interior of the base body 30. Alternatively or additionally, the channel system 6 may have corresponding fluid channels 61, 62 inside the radial arms 30a-30d, 30a*, 30inv that, where necessary, may be connected to the base body, so that (also) the radially extending radial arms 30a-30d, 30a*, 30inv can be heated and/or cooled in a targeted manner by means of an internally guided fluid.

Providing a channel system 6 in the base body 30 and/or in the radial arms 30a-30d, 30a\*, 30inv has proven to be advantageous e.g. in combination with a base body 30 or radial arms 30a-30d, 30a\*, 30inv which are manufactured from a material with a comparatively high thermal expansion coefficient, such as aluminum. Here, the radial expansion that varies strongly based on the temperature can be controlled in a targeted and in particular in an automated manner by means of the fluid that flows inside the fluid channels 61, 62 of the channel system 6 to provide heating during the arrangement of the material layers at the manufacturing tool 3, 3inv and/or the curing, and to provide cooling of the base body 30 and/or the radial arms 30a-30d, 30a\*, 30inv for demolding.

PARTS LIST 11 low-pressure compressor
12 high-pressure compressor
13 high-pressure turbine
14 medium-pressure turbine
15 low-pressure turbine
2 mixer assembly group
20 mixer
200 edge of the mixer
200.1, 200.2 edge segment
201bb, 202bb edge rim
20a-20g batt/material layer
20aa, 20bb, 20cc, 20dd batt/material layer
21 interface
21.1, 21.2 mixer segment
210 guide element
2100 convex outer curvature
220 guide element
2200 concave inner curvature
231, 232, 233, 234 side wall
3 manufacturing tool
30 base body
300 fastening groove
301a* fastening web
30a-30d radial arm
30a* radial arm
30inv radial arm
31 recess
32 thickening
3inv manufacturing tool
4 autoclave
5 injection tool
51 inlet
52 drain
6 channel system
61, 62 (fluid) channel
A exhaust
a1-a5 material layer
a10, a11, a12 inner section
B bypass channel
b1-b4 material layer
Ba material area of lesser stiffness
Bb material area of high stiffness
Bc overlapping area
BK combustion chamber section
C Outlet cone
c1-c4 material layer
c10, c11 inner section
CA arrangement of the sectional lines for cutting
d1-d5 material layer
E inlet/intake
F fan
f1, f2 fluid flow
FC fan housing
FR tissue/fiber roll
L longitudinal direction
L1-L8, La material layer bonding
l1-l9 gap
LRE layer bonding (impregnated with resin)
M central axis/rotational axis
O mixer opening
OL13, OL24, OL35, overlapping area
OL46, OL57, OL68
R inflow direction
R radial direction
RE matrix material
RR matrix reservoir
S1-S8 joint area
T (turbofan) engine
TT turbine
U circumferential direction
V compressor
V1-V4 thickened/reinforced area

The invention claimed is:

1. A method for manufacturing a mixer for an engine for mixing fluid flows from a primary flow channel and a secondary flow channel, comprising:

forming the mixer from a composite material including at least two material layers that respectively contain fibers, wherein each of the at least two material layers include edges, and wherein the mixer includes:

a plurality of first guide elements, each including at least one radially outwardly extending section with respect to a central axis of the mixer;

a plurality at second guide elements respectively positioned adjacent to the first guide elements, wherein each second guide element includes at least one radially inwardly extending section, and wherein the first guide elements and the second guide elements alternate along a circumferential direction of the mixer and extend axially with respect to the central axis of the mixer;

a common side wall shared by adjacent ones at the first guide elements and the second guide elements, wherein the common side wall extends between a radially outermost section of the first guide element and a radially innermost section of the second guide element;

wherein the edges of the at least two material layers are arranged along the central axis of the mixer in at least one of an overlapping manner for at least a local stiffening of a structure of the mixer and edge to edge for at least a local reduction in stiffness of the structure of the mixer; and wherein the edges of the at least two material layers are arranged along the central axis of the mixer at the common side wall in an overlapping manner to form a local thickening of a portion of the common side wall extending axially, wherein the local thickening locally stiffens the structure of the mixer, and wherein the edges of the at least two material layers extend in the axial direction, the circumferential direction, and the radial direction, and wherein the edges of the at least two material layers extend in a curved manner with respect to at least two spatial axes that are perpendicular to each other.

2. The method according to claim 1, further comprising forming the mixer with a manufacturing tool that predefines a contour of the mixer, wherein the at least two material layers are flexible, wherein the at least two material layers are arranged at the manufacturing tool, and wherein the at least two material layers are submitted to a curing process at the manufacturing tool.

3. The method according to claim 2, wherein the curing procedure includes one chosen from an infusion method, an autoclaving process, and an injection method.

4. The method according to claim 2, wherein the manufacturing tool extends along a longitudinal axis that coincides with the central axis of the mixer, wherein the manufacturing tool includes radially outwardly protruding radial arms to define the first guide element and the second guide element, wherein the manufacturing tool includes an outer contour, and wherein the at least two material layers are arranged at the outer contour.

5. The method according to claim 2, wherein the manufacturing tool extends along a longitudinal axis that coincides with the central axis of the mixer, wherein the manufacturing tool includes radially inwardly extending radial arms and an inner contour, wherein the manufacturing tool surrounds a hollow space in the shape of a circular ring, into which the radially inwardly extending radial arms protrude to define the first guide element and the second guide element, and wherein the at least two material layers are arranged at the inner contour.

6. The method according to claim 1, wherein the at least two material layers are formed by one chosen from pre-impregnated batts and batts that are impregnated after having been arranged at a manufacturing tool that predefines a contour of the mixer.

7. The method according to claim 1, wherein the at least two material layers are cut out from a material surface, wherein
- the at least two material layers are provided for forming a segment of the mixer,
- the at least two material layers include geometries that are determined in an automated manner, with at least one design parameter being prescribed, and
- the at least two material layers are cut out from the material surface wherein a specification of an arrangement of sectional lines for the at least two material layers at the material surface is performed in an automated manner.

* * * * *